US012442738B2

(12) United States Patent
Hana et al.

(10) Patent No.: US 12,442,738 B2
(45) Date of Patent: Oct. 14, 2025

(54) CRACK ESTIMATION DEVICE, FAILURE DIAGNOSIS DEVICE, CRACK ESTIMATION METHOD, AND FAILURE DIAGNOSIS METHOD FOR ROTATING MACHINE

(71) Applicant: Mitsubishi Electric Corporation, Tokyo (JP)

(72) Inventors: Norihiko Hana, Tokyo (JP); Masao Akiyoshi, Tokyo (JP); Kenji Amaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 616 days.

(21) Appl. No.: 17/794,271

(22) PCT Filed: Jan. 31, 2020

(86) PCT No.: PCT/JP2020/003592
§ 371 (c)(1),
(2) Date: Jul. 21, 2022

(87) PCT Pub. No.: WO2021/152811
PCT Pub. Date: Aug. 5, 2021

(65) Prior Publication Data
US 2023/0049804 A1 Feb. 16, 2023

(51) Int. Cl.
*G01N 3/08* (2006.01)
(52) U.S. Cl.
CPC ....... *G01N 3/08* (2013.01); *G01N 2203/0017* (2013.01); *G01N 2203/0066* (2013.01)
(58) Field of Classification Search
None
See application file for complete search history.

(56) References Cited

U.S. PATENT DOCUMENTS

| 2014/0229149 A1* | 8/2014 | Guan | G06N 7/01 |
| | | | 703/2 |
| 2017/0343481 A1* | 11/2017 | Jahanshahi | G06N 20/00 |
| 2017/0372196 A1* | 12/2017 | Traidia | G06N 3/042 |

FOREIGN PATENT DOCUMENTS

| JP | 2004069638 A | * | 3/2004 | ............... G01N 3/20 |
| JP | 2005-82862 A | | 3/2005 | |

(Continued)

OTHER PUBLICATIONS

Machine Translation of JP2008256474A (Year: 2008).*

(Continued)

*Primary Examiner* — Kyle R Quigley
*Assistant Examiner* — Ethan Wesley Edwards
(74) *Attorney, Agent, or Firm* — XSENSUS LLP

(57) ABSTRACT

Provided are a shape model setting circuitry for setting a shape model of a target structure, a crack candidate plane in the shape model, and an observation plane of the shape model, an estimation model generator for generating an estimation model obtained from a numerical analysis of a structural analysis model by sequentially changing a boundary condition of the crack candidate plane in the structural analysis model generated from the shape model, and a crack state analyzer for estimating a position and a size of the crack by obtaining a distribution of load and displacement in the crack candidate plane at the same time by probabilistic inference through the application of an observation plane deformation vector indicating deformation of the observation plane obtained from measurement values, the estimation model, and a latent variable indicating presence or absence of the crack in the crack candidate plane.

11 Claims, 18 Drawing Sheets

(56) References Cited

FOREIGN PATENT DOCUMENTS

| JP | 2008256474 A | * 10/2008 | ............... G01L 1/00 |
|----|--------------|-----------|---------------------------|
| JP | 2012-159477 A | 8/2012 | |
| JP | 2015-162188 A | 9/2015 | |
| JP | 2016-211936 A | 12/2016 | |

OTHER PUBLICATIONS

Machine Translation of JP2004069638A (Year: 2004).*
International Search Report and Written Opinion mailed on Mar. 24, 2020, received for PCT Application PCT/JP2020/003592, filed on Jan. 31, 2020, 10 pages including English Translation.

* cited by examiner

Column vector of displacement change in crack candidate plane → Matrix of displacement change in crack candidate plane $$\Delta_{crack\_diff}$$

$$\Delta(0,0) = \begin{pmatrix} \delta(0,0) \\ \delta(1,0) \\ \vdots \\ \delta(n,0) \\ \delta(0,1) \\ \vdots \\ \delta(i',j') \\ \vdots \\ \delta(n,m) \end{pmatrix} = [\Delta(0,0) \quad \cdots \quad \Delta(i,j) \quad \cdots \quad \Delta(n,m)]$$

$$= \begin{bmatrix} \delta_{0\_0}(0,0) & \cdots & \delta_{i\_j}(0,0) & \cdots & \delta_{n\_m}(0,0) \\ \vdots & \ddots & \vdots & \ddots & \vdots \\ \delta_{0\_0}(i',j') & \cdots & \delta_{i\_j}(i',j') & \cdots & \delta_{n\_m}(i',j') \\ \vdots & \ddots & \vdots & \ddots & \vdots \\ \delta_{0\_0}(n,m) & \cdots & \delta_{i\_j}(n,m) & \cdots & \delta_{n\_m}(n,m) \end{bmatrix}$$

$\delta_{i\_j}(i',j')$ : Displacement change at node of coordinates (i', j') in crack candidate plane in result of structural analysis in which node of coordinates (i, j) in crack candidate plane is regarded as crack state.

$$\Delta(0,0) = \begin{pmatrix} \delta_{0\_0}(0,0) \\ \vdots \\ \delta_{0\_0}(i',j') \\ \vdots \\ \delta_{0\_0}(n,m) \end{pmatrix} \cdots \Delta(i,j) = \begin{pmatrix} \delta_{i\_j}(0,0) \\ \vdots \\ \delta_{i\_j}(i',j') \\ \vdots \\ \delta_{i\_j}(n,m) \end{pmatrix} \cdots \Delta(n,m) = \begin{pmatrix} \delta_{n\_m}(0,0) \\ \vdots \\ \delta_{n\_m}(i',j') \\ \vdots \\ \delta_{n\_m}(n,m) \end{pmatrix}$$

FIG. 6

Column vector of strain change in observation plane ⟶ Matrix of strain change in observation plane $$E(0,0) = \begin{pmatrix} \varepsilon(0,0) \\ \varepsilon(1,0) \\ \vdots \\ \varepsilon(n,0) \\ \varepsilon(0,1) \\ \vdots \\ \varepsilon(k,l) \\ \vdots \\ \varepsilon(n,m) \end{pmatrix}$$

$$E_{measure} = [E(0,0) \quad \cdots \quad E(i,j) \quad \cdots \quad E(n,m)]$$

$$= \begin{bmatrix} \varepsilon_{0\_0}(0,0) & \cdots & \varepsilon_{i\_j}(0,0) & \cdots & \varepsilon_{n\_m}(0,0) \\ \vdots & \ddots & \vdots & \ddots & \vdots \\ \varepsilon_{0\_0}(k,l) & \cdots & \varepsilon_{i\_j}(k,l) & \cdots & \varepsilon_{n\_m}(k,l) \\ \vdots & \ddots & \vdots & \ddots & \vdots \\ \varepsilon_{0\_0}(n,m) & \cdots & \varepsilon_{i\_j}(n,m) & \cdots & \varepsilon_{n\_m}(n,m) \end{bmatrix}$$

$\varepsilon_{i\_j}(k,l)$ : Strain change at node of coordinates (k, l) in observation plane in result of structural analysis in which node of coordinates (i, j) in crack candidate plane is regarded as crack state.

$$E(0,0) = \begin{pmatrix} \varepsilon_{0\_0}(0,0) \\ \vdots \\ \varepsilon_{0\_0}(k,l) \\ \vdots \\ \varepsilon_{0\_0}(n,m) \end{pmatrix} \cdots E(i,j) = \begin{pmatrix} \varepsilon_{i\_j}(0,0) \\ \vdots \\ \varepsilon_{i\_j}(k,l) \\ \vdots \\ \varepsilon_{i\_j}(n,m) \end{pmatrix} \cdots E(n,m) = \begin{pmatrix} \varepsilon_{n\_m}(0,0) \\ \vdots \\ \varepsilon_{n\_m}(k,l) \\ \vdots \\ \varepsilon_{n\_m}(n,m) \end{pmatrix}$$

FIG. 7

Column vector of load change in crack candidate plane → Matrix of load change in crack candidate plane $$Z(0,0) = \begin{pmatrix} \zeta(0,0) \\ \zeta(1,0) \\ \vdots \\ \zeta(n,0) \\ \zeta(0,1) \\ \vdots \\ \zeta(i',j') \\ \vdots \\ \zeta(n,m) \end{pmatrix} \quad \begin{aligned} Z_{crack\_diff} &= [Z(0,0) \cdots Z(i',j') \cdots Z(n,m)] \\ &= \begin{bmatrix} \zeta_{0\_0}(0,0) & \cdots & \zeta_{i\_j}(0,0) & \cdots & \zeta_{n\_m}(0,0) \\ \vdots & \ddots & \vdots & \ddots & \vdots \\ \zeta_{0\_0}(i',j') & \cdots & \zeta_{i\_j}(i',j') & \cdots & \zeta_{n\_m}(i',j') \\ \vdots & \ddots & \vdots & \ddots & \vdots \\ \zeta_{0\_0}(n,m) & \cdots & \zeta_{i\_j}(n,m) & \cdots & \zeta_{n\_m}(n,m) \end{bmatrix} \end{aligned}$$

$\zeta_{i\_j}(i',j')$ : Reaction force change at node of coordinates (i', j') in crack candidate plane in result of structural analysis in which node of coordinates (i, j) in crack candidate plane is regarded as crack state.

$$Z(0,0) = \begin{pmatrix} \zeta_{0\_0}(0,0) \\ \vdots \\ \zeta_{0\_0}(i',j') \\ \vdots \\ \zeta_{0\_0}(n,m) \end{pmatrix} \cdots Z(i,j) = \begin{pmatrix} \zeta_{i\_j}(0,0) \\ \vdots \\ \zeta_{i\_j}(i',j') \\ \vdots \\ \zeta_{i\_j}(n,m) \end{pmatrix} \cdots Z(n,m) = \begin{pmatrix} \zeta_{n\_m}(0,0) \\ \vdots \\ \zeta_{n\_m}(i',j') \\ \vdots \\ \zeta_{n\_m}(n,m) \end{pmatrix}$$

FIG. 8

Column vector of displacement change → Matrix of displacement change
in observation plane       in observation plane $$\text{Dis}(0,0) = \begin{pmatrix} d(0,0) \\ d(1,0) \\ \vdots \\ d(n,0) \\ d(0,1) \\ \vdots \\ d(k,l) \\ \vdots \\ d(n,p) \end{pmatrix}$$

$$Dis_{measure} = [Dis(0,0) \quad \cdots \quad Dis(i,j) \quad \cdots \quad Dis(n,m)]$$

$$= \begin{bmatrix} d_{0\_0}(0,0) & \cdots & d_{i\_j}(0,0) & \cdots & d_{n\_m}(0,0) \\ \vdots & \ddots & \vdots & \ddots & \vdots \\ d_{0\_0}(k,l) & \cdots & d_{i\_j}(k,l) & \cdots & d_{n\_m}(k,l) \\ \vdots & \ddots & \vdots & \ddots & \vdots \\ d_{0\_0}(n,p) & \cdots & d_{i\_j}(n,p) & \cdots & d_{n\_m}(n,p) \end{bmatrix}$$

$d_{i\_j}(k,l)$ : Displacement change at node of coordinates (k, l) in observation plane in result of structural analysis in which node of coordinates (i, j) in crack candidate plane is regarded as crack state.

$$\text{Dis}(0,0) = \begin{pmatrix} d_{0\_0}(0,0) \\ \vdots \\ d_{0\_0}(k,l) \\ \vdots \\ d_{0\_0}(n,p) \end{pmatrix} \cdots \text{Dis}(i,j) = \begin{pmatrix} d_{i\_j}(0,0) \\ \vdots \\ d_{i\_j}(k,l) \\ \vdots \\ d_{i\_j}(n,p) \end{pmatrix} \cdots \text{Dis}(n,m) = \begin{pmatrix} d_{n\_m}(0,0) \\ \vdots \\ d_{n\_m}(k,l) \\ \vdots \\ d_{n\_m}(n,p) \end{pmatrix}$$

FIG. 12

Column vector of angle change → Matrix of angle change
in observation plane        in observation plane $$A(0,0) = \begin{pmatrix} a(0,0) \\ a(1,0) \\ \vdots \\ a(n,0) \\ a(0,1) \\ \vdots \\ a(k,l) \\ \vdots \\ a(n,p) \end{pmatrix}$$

$$A_{measure} = [A(0,0) \cdots A(i,j) \cdots A(n,m)]$$

$$= \begin{bmatrix} a_{0\_0}(0,0) & \cdots & a_{i\_j}(0,0) & \cdots & a_{n\_m}(0,0) \\ \vdots & \ddots & \vdots & \ddots & \vdots \\ a_{0\_0}(k,l) & \cdots & a_{i\_j}(k,l) & \cdots & a_{n\_m}(k,l) \\ \vdots & \ddots & \vdots & \ddots & \vdots \\ a_{0\_0}(n,p) & \cdots & a_{i\_j}(n,p) & \cdots & a_{n\_m}(n,p) \end{bmatrix}$$

$a_{i\_j}(k,l)$ : Angle change at node of coordinates (k, l) in observation plane in result of structural analysis in which node of coordinates (i, j) in crack candidate plane is regarded as crack state.

$$A(0,0) = \begin{pmatrix} a_{0\_0}(0,0) \\ \vdots \\ a_{0\_0}(k,l) \\ \vdots \\ a_{0\_0}(n,p) \end{pmatrix} \cdots A(i,j) = \begin{pmatrix} a_{i\_j}(0,0) \\ \vdots \\ a_{i\_j}(k,l) \\ \vdots \\ a_{i\_j}(n,p) \end{pmatrix} \cdots A(n,m) = \begin{pmatrix} a_{n\_m}(0,0) \\ \vdots \\ a_{n\_m}(k,l) \\ \vdots \\ a_{n\_m}(n,p) \end{pmatrix}$$

FIG. 13

CRACK ESTIMATION DEVICE, FAILURE DIAGNOSIS DEVICE, CRACK ESTIMATION METHOD, AND FAILURE DIAGNOSIS METHOD FOR ROTATING MACHINE

CROSS-REFERENCE TO RELATED APPLICATION

The present application is based on PCT filing PCT/JP2020/003592, filed Jan. 31, 2020, the entire contents of which are incorporated herein by reference.

TECHNICAL FIELD

The present application relates to a crack estimation device, a failure diagnosis device, a crack estimation method, and a failure diagnosis method for a rotating machine.

BACKGROUND ART

Hidden cracks that cannot be seen from the surface of a rotor structure, etc. in a rotating machine applied to a turbine generator generally cannot be inspected visually, and crack extension occurs without being noticed by a normal inspection, affecting the lifetime of the structure. Therefore, detecting the hidden cracks from the surface has become an important issue for the inspection of a structure, and there are methods to inspect the hidden cracks nondestructively, such as strain measurement on the surface of the structure, ultrasonic inspection (for example, refer to Patent Document 1), X-ray inspection, etc.

A device for the strain measurement on the surface of a structure is easier to be miniaturized than those of other non-destructive inspection methods and can be implemented at lower cost. However, since the crack itself is not directly measured, it is necessary to estimate the hidden crack, which cannot be seen from the surface, by an inverse analysis using a relationship between the strain on the surface of the structure and the crack.

CITATION LIST

Patent Document

Patent Document 1: Japanese Patent Application Laid-Open Publication No. 2012-159477 (Paragraphs 0013 to 0031, FIG. 1 to FIG. 8)

SUMMARY OF INVENTION

Problems to be Solved by Invention

As a method for estimating a crack hidden from the surface, there is a method in which a relationship between the crack and a shape change of the surface is prepared beforehand as learning data, and a position and a size of the crack are estimated from the data. However, this estimation is to solve an inverse problem, and it is an ill-posedness problem. In the case of the ill-posedness problem, estimation of a hidden crack using the least square method from the measurement data and the learning data has lower accuracy, and whether or not to stop equipment operation or the period of use cannot be determined.

The present application discloses a technique for solving the above-mentioned problems, and an object thereof is to accurately estimate a size and a position of a crack from a change in the shape of the surface.

Means for Solving Problems

A crack estimation device, disclosed in the present application includes a shape model setting unit to set a shape model of a target structure to be inspected to which an external force is applied, a crack candidate plane in which a crack hidden from surfaces of the shape model is expected to occur, and an observation plane to be measured among the surfaces of the shape model, an estimation model generation unit to generate a matrix for estimating a state of the crack candidate plane from a state of the observation plane using matrices for associating the state of the crack candidate plane with the state of the observation plane, the matrices being obtained by a numerical analysis of a structural analysis model generated from the shape model, and a crack state analysis unit to estimate a position and a size of the crack by obtaining distribution of load and displacement in the crack candidate plane at the same time by probabilistic inference through application of an observation plane deformation vector indicating deformation of the observation plane obtained from actual measurement values of the observation plane, an estimation model, and a latent variable indicating presence or absence of the crack in the crack candidate plane.

A crack estimation method disclosed in the present application includes a shape model setting step of setting a shape model of a target structure to be inspected to which an external force is applied, a crack candidate plane in which a crack is expected to occur in a portion hidden from surfaces of the shape model, and an observation plane to be measured among the surfaces of the shape model, an estimation model generation step of generating the matrix for estimating a state of the crack candidate plane from a state of the observation plane using the matrices for associating the state of the crack candidate plane with the state of the observation plane, the matrices being obtained by a numerical analysis of a structural analysis model generated from the shape model, a step of receiving actual measurement values of the observation plane, and a crack state analysis step of estimating a position and a size of the crack by obtaining distribution of load and displacement in the crack candidate plane at the same time by the probabilistic inference through the application of the observation plane deformation vector indicating the deformation of the observation plane obtained from the measurement values, the estimation model, and the latent variable indicating presence or absence of the crack in the crack candidate plane.

Effect of Invention

According to the crack estimation device or the crack estimation method disclosed in the present application, since the latent variable indicating behavior of displacement and load of a plane in which a crack occurs are used in the inverse analysis, the state of a hidden crack can be accurately estimated from the shape change of the surface.

BRIEF DESCRIPTION OF DRAWINGS

FIG. 6 is a diagram showing a memory structure for storing displacement information of the crack candidate plane in the crack estimation device or the crack estimation method according to Embodiment 1.

FIG. 7 is a diagram showing a memory structure for storing deformation information of the observation plane in the crack estimation device or the crack estimation method according to Embodiment 1.

FIG. 8 is a diagram showing a memory structure for storing load information of the crack candidate plane in the crack estimation device or the crack estimation method according to Embodiment 1.

FIG. 12 is a diagram showing a memory structure for storing information on a displacement change of an observation plane in a crack estimation device or a crack estimation method according to Embodiment 2.

FIG. 13 is a diagram showing a memory structure for storing information on an angle change of the observation plane in the crack estimation device or the crack estimation method according to Embodiment 2.

MODES FOR CARRYING OUT INVENTION

Figure 1:
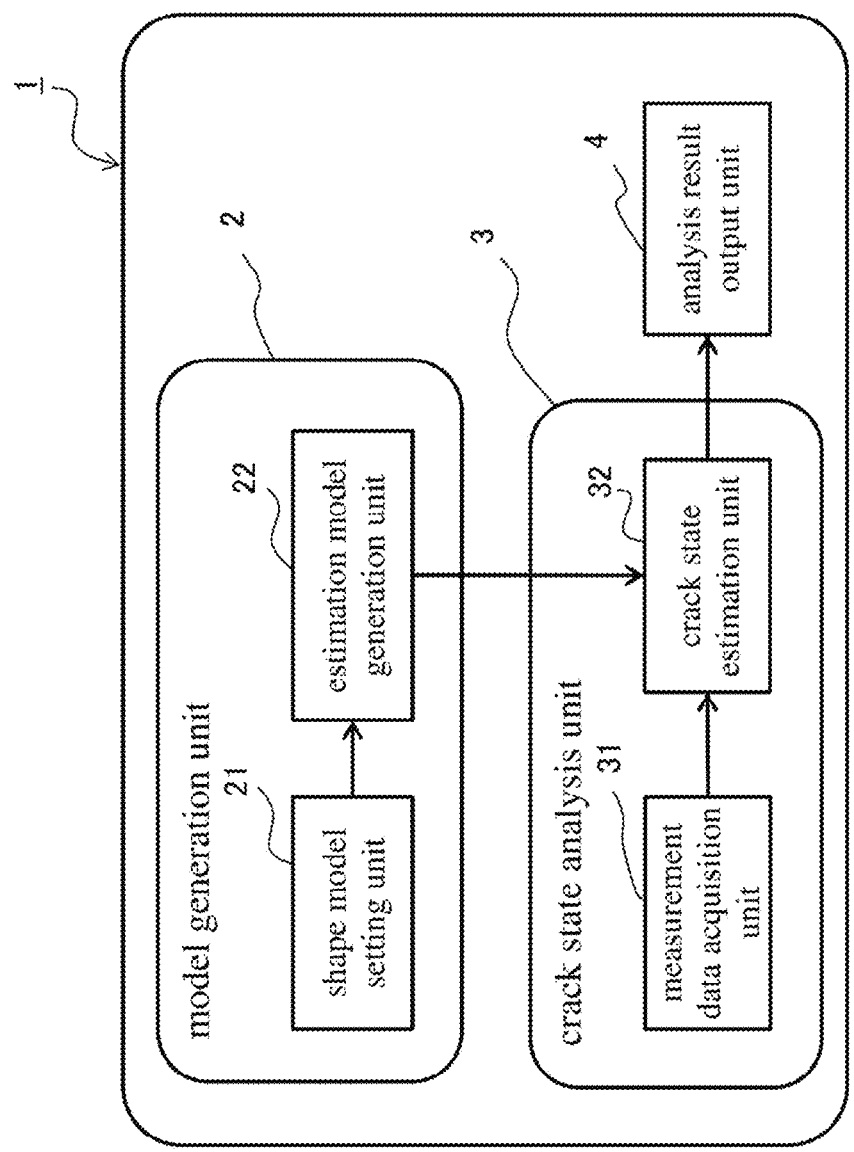
FIG. 1 is a block diagram for explaining a configuration of a crack estimation device according to Embodiment 1.

Hereinafter, a crack estimation device, a crack estimation method, and an inspection method of a rotating machine according to each embodiment of the present application will be described referring to the drawings, in which the same or corresponding members and parts are denoted by the same reference numerals.

Embodiment 1

EMBODIMENT 1

Figure 2:
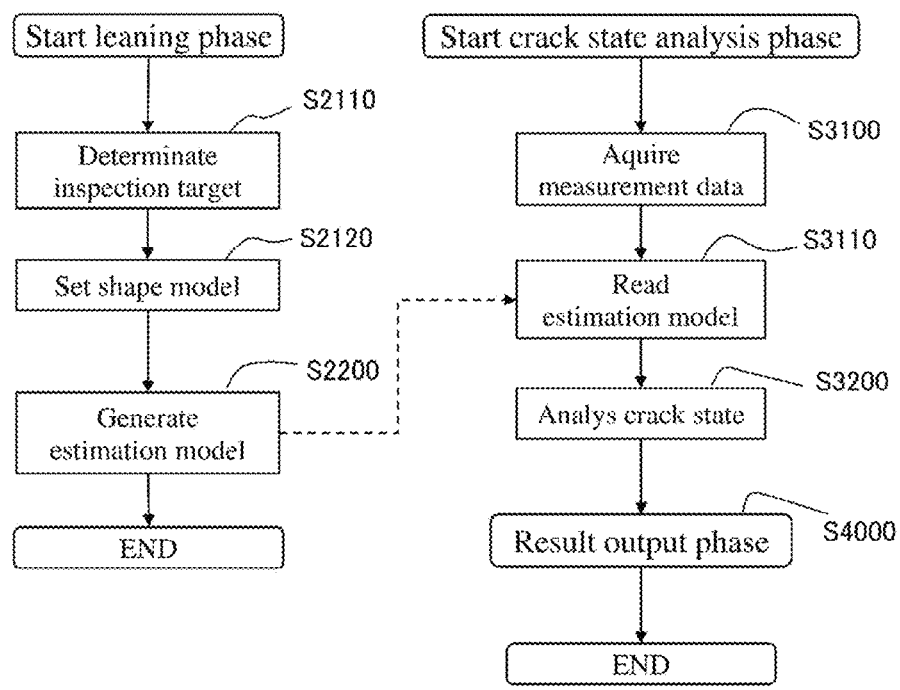
FIG. 2 is a flowchart showing operation of the crack estimation device and a crack estimation method according to Embodiment 1.
Figure 3A:
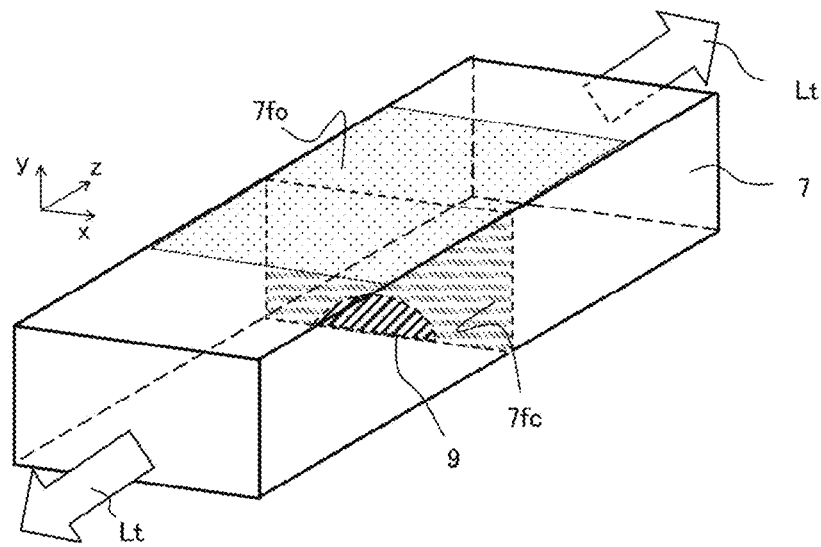
FIG. 3A and FIG. 3B are perspective views showing a relationship between a crack candidate plane in which a crack is assumed to occur and an observation plane when a tensile load is applied to a flat plate and when a bending moment is applied, respectively, in the operation of the crack estimation device and in the crack estimation method according to Embodiment 1.
Figure 3B:
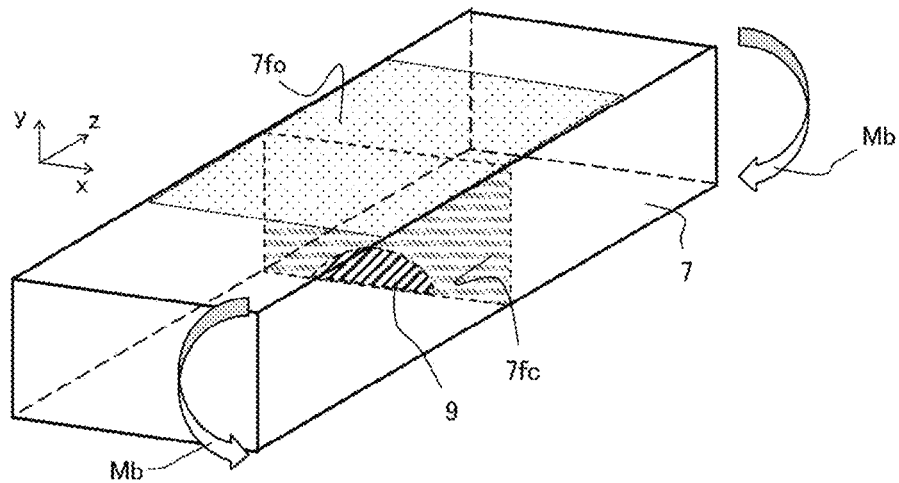
Figure 4A:
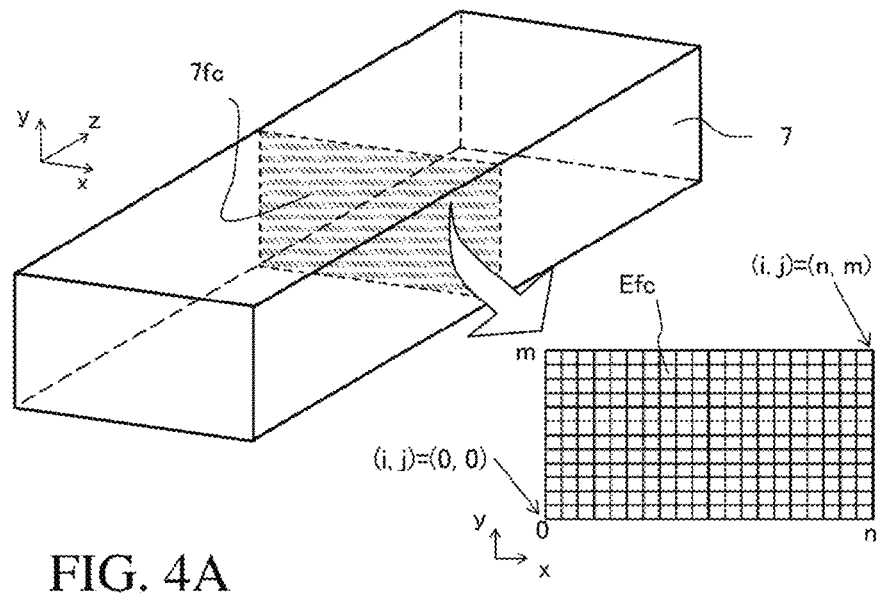
FIGS. 4A and 4B are schematic views showing a state in which the crack candidate plane is divided into elements and a state in which the observation plane is divided into elements, respectively, in the operation of the crack estimation device and in the crack estimation method according to Embodiment 1.
Figure 4B:
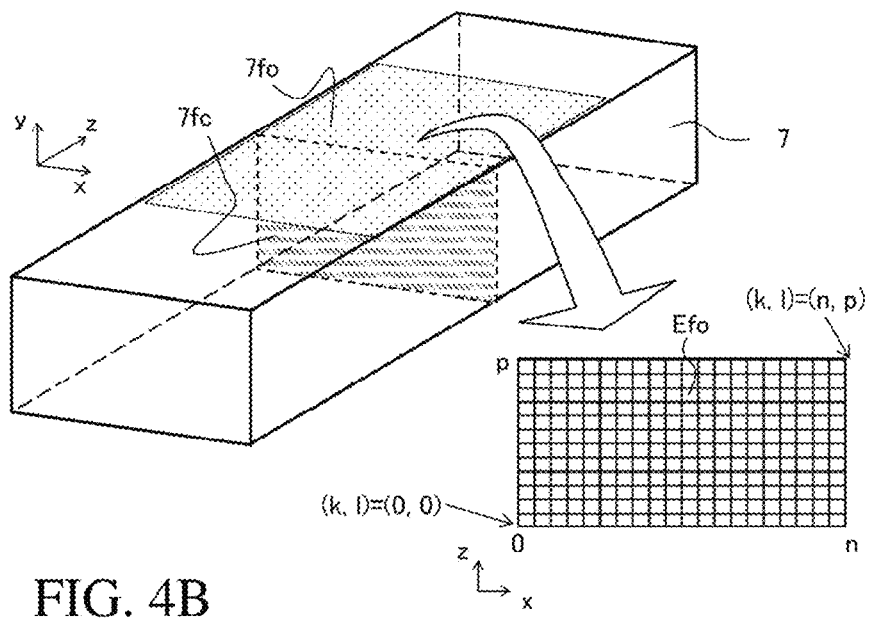

FIG. 1 to FIG. 11A and FIG. 11B are block diagrams for explaining a configuration and operation of a crack estimation device and a crack estimation method according to Embodiment 1, FIG. 1 is a block diagram for explaining the configuration of the crack estimation device, and FIG. 2 is a flowchart showing the operation of the crack estimation device or the crack estimation method. FIG. 3A is a perspective view showing a relationship between a plane in which a crack is assumed to occur (crack candidate plane) and an observation plane in which measurement from the outside is possible when a tensile load is applied to a flat plate and FIG. 3B is a perspective view showing a relationship between the crack candidate plane and the observation plane when a bending moment is applied to the flat plate. FIG. 4A is a schematic view showing a state in which the crack candidate plane is divided into elements in a grid pattern for a structural analysis and FIG. 4B is a schematic view showing a state in which the observation plane is divided into elements.

Figure 5:
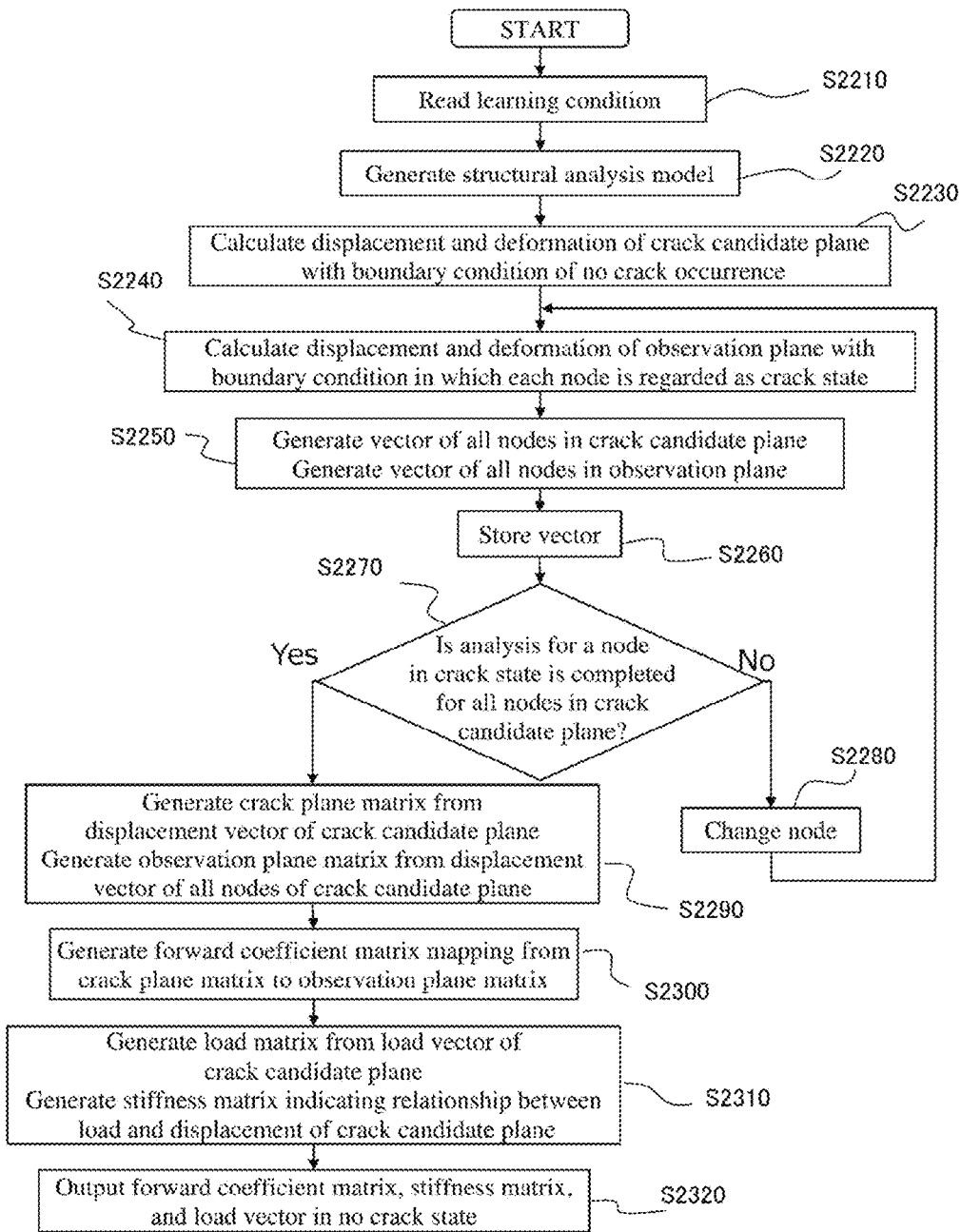
FIG. 5 is a flowchart showing operation of an estimation model generation unit of the crack estimation device or estimation model generation steps according to Embodiment 1.

FIG. 5 is a flowchart showing operation of an estimation model generation unit constituting the crack estimation device or estimation model generation steps. FIG. 6 to FIG. 8 show memory structures stored when an estimation model described in FIG. 5 is generated, FIG. 6 shows a memory structure for storing displacement information of the crack candidate plane, FIG. 7 shows a memory structure for storing deformation information of the observation plane, and FIG. 8 shows a memory structure for storing load information of the crack candidate plane.

Figure 9:
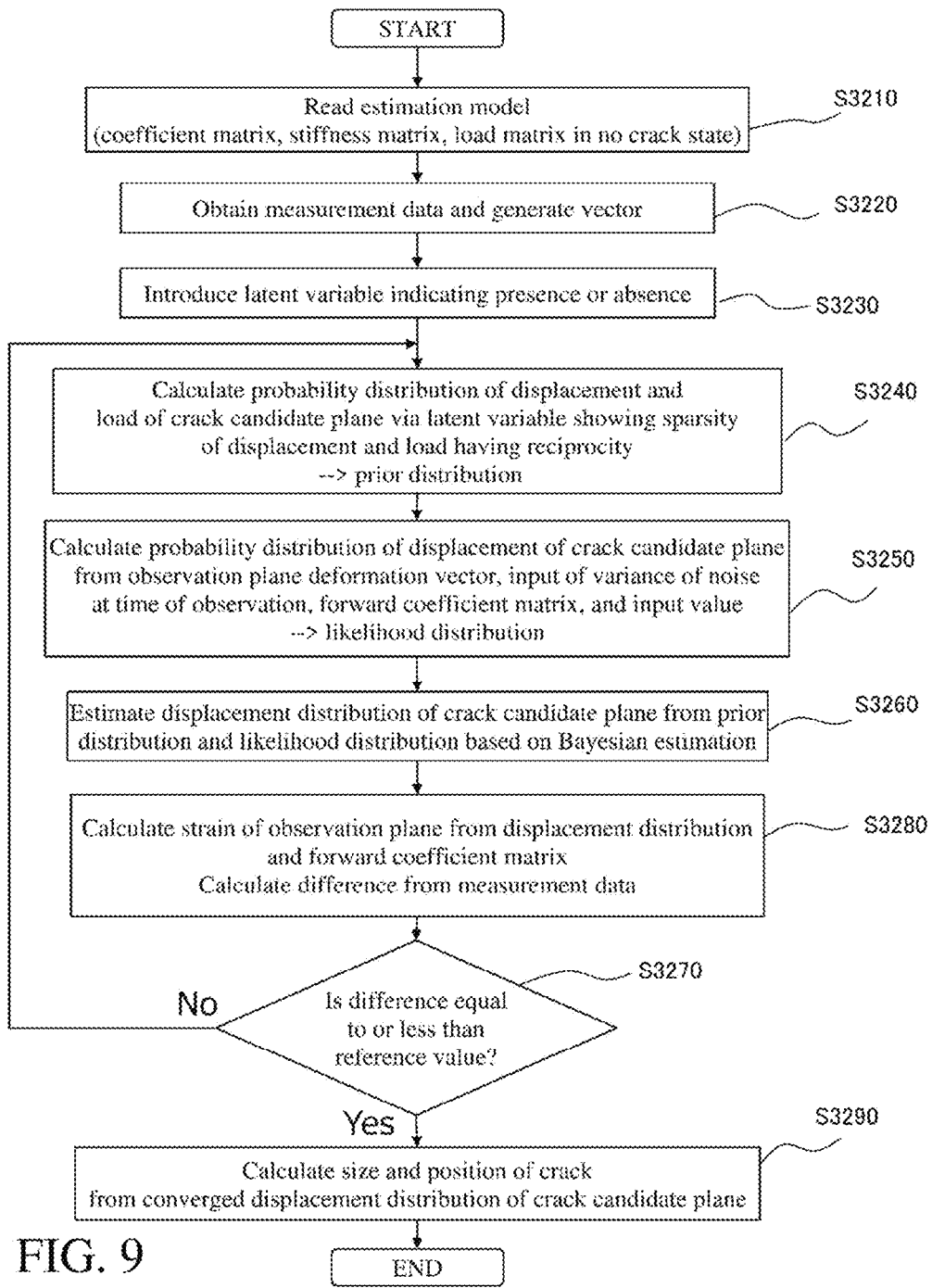
FIG. 9 is a flowchart showing operation of a crack state estimation unit of the crack estimation device or crack state estimation steps according to Embodiment 1.
Figure 10:
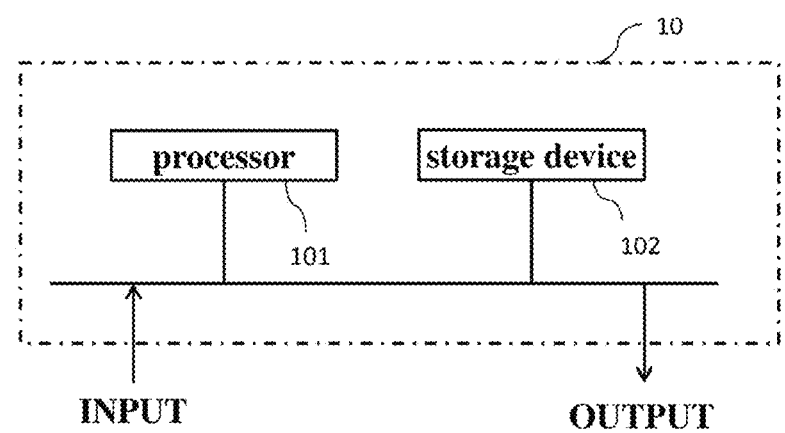
FIG. 10 is a diagram showing an example in which a part for executing calculation processing of the crack estimation device or at least a part of functions in the crack estimation method and a failure diagnosis method for a rotating machine according to embodiments including Embodiment 1 is implemented by a software.
Figure 11A:
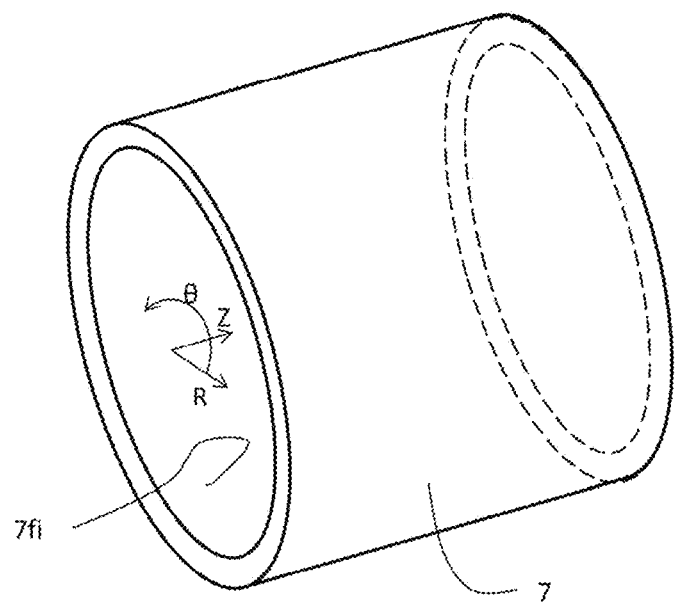
FIG. 11A and FIG. 11B are a perspective view of a cylinder indicated with a coordinate system when internal pressure is applied to the cylinder and a plan view thereof with the internal pressure applied, respectively, in the operation of the crack estimation device, the crack estimation method, or the failure diagnosis method for the rotating machine according to embodiments including Embodiment 1.
Figure 11B:
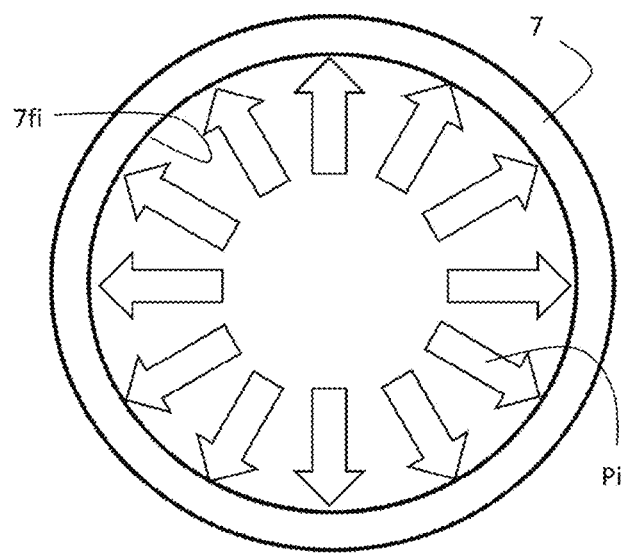

FIG. 9 is a flowchart showing operation of a crack state estimation unit constituting the crack estimation device or crack state estimation steps. FIG. 10 is a diagram showing a hardware example in which a part for executing calculation processing of the crack estimation device or at least a part of functions in the crack estimation method according to Embodiment 1 or the following embodiments is implemented by a software. FIG. 11A is a perspective view of a cylinder indicated with a coordinate system when an internal pressure is applied to the cylinder and FIG. 11B is a plan view thereof with the internal pressure applied, in the crack estimation device or the crack estimation method.

In the crack estimation device, the crack estimation method, and the inspection method of the rotating machine according to each of embodiments including the present embodiment, behavior of displacement and load in a plane in which a crack occurs is used as foresight information for solving an ill-posedness problem. Thus, the position and size of a hidden crack can be accurately estimated from a shape change of a surface. This will be described in detail below.

A crack estimation device 1 comprises, as shown in FIG. 1, a model generation unit 2 which calculates learning data and generates an estimation model, a crack state analysis unit 3 which analyzes a state of a crack from measurement values of the surface of an inspection target using the generated estimation model, and an analysis result output unit 4 which outputs an analysis result.

The model generation unit 2 is configured with a shape model setting unit 21 for setting a learning condition, and an estimation model generation unit 22 for generating an estimation model used to estimate a crack on the basis of the set learning condition and outputting the generated estimation model to the crack state analysis unit 3. The crack state analysis unit 3 includes a measurement data acquisition unit 31 for acquiring measurement data indicating the surface state of the inspection target, such as strain and displacement, and a crack state estimation unit 32 for applying the measurement data to the estimation model, calculating a position and a size of a crack hidden from the surface, and outputting the result to the analysis result output unit 4.

The shape model setting unit 21 has a function of determining, as a learning condition, a portion where the crack is inspected, generating a shape model for the portion to be inspected, determining a shape of an assumed crack, and outputting the result to the estimation model generating unit 22. The estimation model generation unit 22 sequentially changes the shape and position of the assumed crack, performs a numerical analysis on a structural analysis model generated from the shape model, stores the displacement and the load of the crack candidate plane, and the deformation of the observation plane as vectors in a primary storage unit, and represents the analysis result of total crack shapes that are stored as a matrix. Then, using the linear relationship between the displacement of the crack candidate plane and the deformation of the observation plane, a forward coefficient matrix between a displacement matrix of the crack and a deformation matrix of the observation plane is obtained. Further, it has a function of obtaining a stiffness matrix between the displacement matrix of the crack and a load matrix of the crack by using the linear relationship between the displacement and the load of the crack candidate plane, and outputting the obtained stiffness matrix to the crack state estimation unit 32.

The measurement data acquisition unit 31 acquires measurement data at the time when the deformation of the observation plane of a target structure as the inspection target is measured. The crack state estimation unit 32 estimates the size and position of a crack from the displacement of the crack candidate plane by using the displacement matrix calculated from the measurement data output from the measurement data acquisition unit 31, and the load matrix and the stiffness matrix of the crack output as an estimation model. At this time, the displacement and the load are estimated at the same time by Joint estimation-Maximum A Posteriori (JE-MAP) estimation by using a latent variable showing sparsity of the displacement and the load in the crack candidate plane, the displacement and the load having reciprocity. Further, using the estimated crack size, determination on whether the structure can be used or not is made, the remaining period of use is calculated, and they are output to the analysis result output unit 4.

The analysis result output unit 4 outputs the estimated size and position of the crack on the basis of the analysis result output from the crack state estimation unit 32. Further, as an inspection result for equipment having a structure such as the rotating machine, a determination on whether or not the equipment can still be continuously used, a remaining period of use of the equipment, and the like are output.

The operation according to the above-described configuration will be described referring to the flowchart of FIG. 2. First, the model generation unit 2 executes a learning phase (steps S2110 to S2200) in which conditions for the learning data are determined, learning data are generated according to the determined conditions, and an estimation model used for estimating the crack state is generated on the basis of the generated learning data. Then, on the basis of the generated estimation model, the crack state analysis unit 3 executes a crack state analysis phase (steps S3100 to S3200) in which the crack state is estimated from the measurement data of the surface state of the inspection target. Finally, the analysis result output unit 4 executes a result output phase (step S4000) for displaying (outputting) the analysis result.

Learning Phase

In the learning phase, as the conditions for the learning data, an inspection target determination step (step S2110) for determining a structure for inspecting the presence or absence of a crack, a portion hidden from the surface of the structure for estimating the presence or absence of crack occurrence, and a portion of the surface of the structure to be measured for estimating the presence or absence of the crack occurrence is executed. For example, as shown in FIG. 3A, a target structure 7 of a flat plate is determined as the structure, and a crack candidate plane 7$fc$ is determined as a target for estimating the occurrence of a crack 9. Then, a region close to the crack candidate plane 7$fc$ in the surface of the target structure 7 is determined as an observation plane 7$fo$ for measuring strain as a surface to be measured.

Then, assuming a state in which a tensile load Lt is applied to the target structure 7 at the time of inspection, a shape model of an inspection portion is set as the whole or a part of the target structure 7 (step S2120). Here, when the entire target structure 7 is modeled, the constraint of the deformation applied to the target structure 7, the temperature distribution and the like in addition to the load are confirmed as a boundary condition for the structural analysis. On the other hand, when the model to be a part thereof is used, the distribution of displacement or load in the cut-out surface is reflected in the structural analysis as the boundary condition.

Note that, for example, a bending moment Mb as shown in FIG. 3B may be applied to the target structure 7, and it is not limited to the above-described tensile load Lt. Then, an inspection target is determined, and a shape model is set in the same manner. First, as shown in FIG. 4A, the crack candidate plane 7$fc$ in the shape model is sectioned into a grid pattern and divided into a plurality of elements Efc. In FIG. 4A, the crack candidate plane 7$fc$ is divided into n pieces in the x-direction and m pieces in the y-direction, and the positions of the intersecting points of the grid including division lines are indicated by coordinates (i, j). Therefore, the coordinates (i, j) are indicated by numbers starting from (0, 0) up to (n, m).

Defined to be one point of the intersecting points of the grid as the crack 9, the crack 9 is sequentially moved on all of the intersecting points (grid points: coordinates (i, j)). The order of the movement is determined in step S2120. For each structural analysis in which the boundary condition of the crack 9 of the crack candidate plane 7$fc$ is changed, the displacement and the load obtained at the grid points of the crack candidate plane 7$fc$ are stored in the analyzed order. In addition, components of the displacement to be stored are the largest components of the displacement within the crack candidate plane 7$fc$ with respect to the tensile load Lt or the bending moment Mb shown in FIG. 3A or 3B.

Next, as shown in FIG. 4B, the observation plane 7fo, which is a measurement target for estimating the crack 9 and is a region for acquiring deformation information of the surface of the target structure 7, is determined. In the present embodiment, the strain is measured as the deformation of the surface. The observation plane 7fo is also sectioned into a grid pattern and divided into a plurality of elements Efo, similar to the crack candidate plane 7fc. In FIG. 4B, the observation plane 7fo is divided into n pieces in the x-direction and p pieces in the z-direction, and the positions of the intersecting points of the grid including the division lines are indicated by coordinates (k, l). Therefore, the coordinates (k, l) are indicated by numbers starting from (0,0) up to (n, p). Note that the observation plane 7fo may be determined as a part in a series of connected planes, or a group of a plurality of regions, or may be determined such that a certain region is composed of points.

Then, for each structural analysis in which the boundary condition of the crack 9 in the crack candidate plane 7fc is changed, the strain obtained at a grid point of the observation plane 7fo is stored in the analyzed order. The order of the storing is also determined in step S2120. Further, components of the strain to be stored are the largest components of the strain with respect to the tensile load Lt or the bending moment Mb shown in FIG. 3A or 3B. In addition, as the strain when the load or the moment is applied to two axes (for example, the z-axis and the y-axis), the principal strain, the Tresca equivalent strain (based on yield criterion), and the Mises equivalent strain (based on yield criterion), which are parameters for evaluating the strain in a multiaxial stress field caused by the effect of a multiaxial load or a structure, may be used.

When the shape model is set in steps S2110 and S2120, using the set conditions, an estimation model generation step S2200 for automatically generating learning data and obtaining an inverse matrix generated from the learning data is executed. Note that the shape model setting unit 21 executes the inspection target determination step S2110 and the shape model setting step S2120 described above, and the estimation model generation unit 22 executes the estimation model generation step S2200 described below.

A detailed flow in the estimation model generation step S2200 will be described referring to the flowchart of FIG. 5. First, the shape model including the crack candidate plane 7fc and the observation plane 7fo, the shape and the position of the crack 9 to be assumed for the learning, and a learning order, which are determined in steps S2110 and S2120, are read out (step S2210). Next, a structural analysis model is generated from the shape model (step S2220). Further, the crack candidate plane 7fc and the observation plane 7fo in the generated structural analysis model are divided into a plurality of the elements Efc and Efo, respectively, a boundary condition in which no crack 9 occurs is given, and the displacement of the crack candidate plane 7fc and the deformation of the observation plane 7fo are calculated in the structural analysis (step S2230).

Next, the crack candidate plane 7fc of the structural analysis model is divided into a plurality of the elements Efc, and a boundary condition in which each node included in the elements Efc is set as the crack 9 is given to calculate the deformation of the observation plane 7fo by the structural analysis (step S2240). Then, for each condition of the node defined as the crack 9, vectors are generated by arranging the differences in the displacement and the differences in the load for all the nodes of the crack candidate plane 7fc before and after the generation of the crack 9 in the order in which they are to be learned. Further, for all the nodes of the observation plane 7fo, vectors are generated by arranging the differences in the deformation before and after the generation of the crack 9 in the order in which they are to be learned (step S2250), and the generated vectors are stored in the primary storage unit (step S2260).

Then, it is determined whether or not the structural analysis for a node in the crack state has been completed for all the nodes of the crack candidate plane 7fc (step S2270). If it is not completed ("No" in step S2270), in order to set all the nodes of the crack candidate plane 7fc to the crack state, a node is changed to the crack state (step S2280), and the process returns to step S2240 for performing the structural analysis, and then the process for storing the vectors in the primary storage unit is re-executed.

On the other hand, if the structural analysis for a node in the crack state has been completed for all the nodes of the crack candidate plane 7fc ("Yes" in step S2270), the process proceeds to step S2290. In step S2290, a crack plane matrix is generated by arranging the displacement vectors of the crack candidate plane 7fc stored in the primary storage unit in the order of reading for the learning, and an observation plane matrix is generated from the vectors of the deformation of all the nodes in the observation plane 7fo stored in the primary storage unit (step S2290).

Specifically, as shown in FIG. 6, a column vector $\Delta(0,0)$ of the displacement change of the crack candidate plane 7fc is such that the displacement data of the nodes of the crack candidate plane 7fc is arranged in the order determined in the shape model setting step S2120. $\delta(i, j)$ in the column vector $\Delta(0,0)$ indicates the displacement of the node at the coordinates (i, j) in the crack candidate plane 7fc. Further, the column vector of $\Delta(i, j)$ is generated with the coordinates (i, j) in the crack candidate plane 7fc as the information on the position (coordinates) for the learning at which the crack 9 is made to occur, and components in the column vector are denoted by $\delta_{i\_j}(i', j')$. $\delta_{i\_j}(i', j')$ indicates the displacement at the node of the coordinates (i', j') in the crack candidate plane 7fc in a result of the structural analysis in which the node of the coordinates (i, j) in the crack candidate plane 7fc is regarded to be in the crack state. This column vector is arranged in rows in the order of the position where the crack 9 occurs, determined in the shape model setting step S2120, to generate the crack plane matrix $\Delta_{crack\_diff}$.

Next, as shown in FIG. 7, a column vector $E(0,0)$ of the strain change of the observation plane 7fo is also similarly such that the strain data of the nodes of the observation plane 7fo is arranged in the order determined in the shape model setting step S2120. $\varepsilon(k, l)$ in the column vector $E(0,0)$ indicates the strain at the node of the coordinates (k, l) in the observation plane 7fo. Further, the column vector of $E(i, j)$ is generated with the coordinates (i, j) in the crack candidate plane 7fc as the information on the position (coordinates) for the learning at which the crack is made to occur, and components in the column vector are denoted by $\varepsilon_{i\_j}(k, l)$. $\varepsilon_{i\_j}(k, l)$ indicates the strain at the node of coordinates (k, l) in the observation plane 7fo in a result of the structural analysis in which the node of coordinates (i, j) in the crack candidate plane 7fc is regarded to be in the crack state. This column vector is arranged in rows in the order of the position where the crack 9 occurs, determined in the shape model setting step S2120, to generate a crack plane matrix $\Delta_{crack\_diff}$.

When the crack plane matrix $\Delta_{crack\_diff}$ and the observation plane matrix $E_{measure}$ are generated in this way, using the linear relationship between the displacement of the crack candidate plane 7fc and the deformation of all the nodes in the observation plane 7fo, a forward coefficient matrix D for mapping from the crack plane matrix to the observation plane matrix is defined using Equation (1). Then, by multiplying both members of the Equation (1) by the inverse matrix $\Delta_{crack\_diff}^{-1}$ of the crack plane matrix $\Delta_{crack\_diff}$ from the right side as shown in Equation (2), the forward coefficient matrix D is generated from the crack plane matrix $\Delta_{crack\_diff}$ and the observation plane matrix $E_{measure}$ as shown in Equation (3) (step S2300).

$$D\Delta_{crack\_diff} = E_{measure} \quad (1)$$

$$D\Delta_{crack\_diff}[\Delta_{crack\_diff}]^{-1} = E_{measure}[\Delta_{crack\_diff}]^{-1} \quad (2)$$

$$D = E_{measure}[\Delta_{crack\_diff}]^{-1} \quad (3)$$

Next, a load vector of the crack candidate plane 7fc stored in the primary storage unit is arranged in the order of the learning, and a load matrix of the crack candidate plane 7fc is generated (step S2310). As shown in FIG. 8, a column vector Z(0,0) of the load change of the crack candidate plane 7fc is also such that the load data of the nodes of the crack candidate plane 7fc is arranged in the order determined in the shape model setting step S2120. $\zeta(i, j)$ in the column vector Z(0,0) indicates the load at the node of the coordinates (i, j) in the crack candidate plane 7fc. Further, the column vector of coordinates (i, j) is generated with the coordinates (i, j) in the crack candidate plane 7fc as the information on the position (coordinates) for the learning at which the crack 9 is made to occur, and components in the column vector are denoted by $\zeta_{i\_j}(i', j')$. $\zeta_{i\_j}(i', j')$ indicates the load (reaction force) at the node at the position of the coordinates (i', j') in the crack candidate plane 7fc in a result of the structural analysis in which the node at the coordinates (i, j) in the crack candidate plane 7fc is regarded to be in the crack state. The column vector is arranged in rows in the order of the position of the crack 9 (coordinates), by which the column vector is determined, to generate the load matrix $Z_{crack\_diff}$.

Next, a stiffness matrix G from the linear relationship between the displacement and the load of the crack candidate plane 7fc, and a load vector of the crack candidate plane 7fc in the case where there is no crack are generated. The load matrix $Z_{crack\_diff}$ and the crack plane matrix $\Delta_{crack\_diff}$ are expressed by the following Equation (4). Here, $Z_{no\_crack}$ is the load vector of the crack candidate plane 7fc in the case where there is no crack. By moving $Z_{crack\_diff}$ from the left side of Equation (4) to the right side and $G\Delta_{crack\_diff}$ to the left side, and multiplying both members by the inverse matrix $\Delta_{crack\_diff}^{-1}$ of the crack plane matrix $\Delta_{crack\_diff}$ from the right side as in Equation (2), the stiffness matrix G is obtained as Equation (5).

$$Z_{crack\_diff} = G\Delta_{crack\_diff} + Z_{no\_crack} \quad (4)$$

$$G = (Z_{crack\_diff} - Z_{no\_crack})[\Delta_{crack\_diff}]^{-1} \quad (5)$$

Then, the forward coefficient matrix D, the stiffness matrix G, and the load vector in the case where there is no crack, which are generated, are output to the crack state analysis unit 3 as a model for estimating the crack (step S2320), and thus the learning phase ends.

Crack State Analysis Phase

When the learning phase described above is completed, a crack state analysis phase for estimating the state of the crack in the target structure 7, which can be used for failure detection, can be performed. Hereinafter, operation of the crack state analysis phase executed by the crack state analysis unit 3 will be described referring to the flowchart of FIG. 9.

In the crack state analysis phase, first, data of the forward coefficient matrix D, the stiffness matrix G, and the load vector when there is no crack are read into the crack state estimation unit 32 as an estimation model generated in the learning phase as a preparation for analyzing the crack state (step S3210). Then, for example, when the state of the crack is estimated for the failure detection or the like, the measurement data acquisition unit 31 acquires measurement data which is obtained through an actual measurement of the observation plane 7fo of the target structure 7.

As an example of the measurement data, strain will be used to describe the example. The measurement methods are those by using strain gauges, a digital image correlation method, etc. However, the strain here is held as an initial value that is, for example, a strain value measured before or immediately after the use of the target structure 7 in a state in which no crack 9 occurs in a portion hidden from the surface. Then, the difference between the strain value measured in a state at a time when the occurrence of the crack 9 is suspected, such as at the time of a failure diagnosis, and the held initial value is acquired as the strain data.

The measured strain data are arranged as column vectors of the strain in the same manner as the observation plane matrix $E_{measure}$ in the order determined by the estimation model (step S3220). The measured strain data is at the same position as the strain data at the time of the learning. Next, a vector L of the latent variable indicating presence or absence of the crack 9 in the crack candidate plane 7fc is introduced as shown in Equation (6) (step S3230). In the vector L, i and j of lv (i, j) indicate a position (coordinates) in the crack candidate plane 7fc that is the same as that in the load matrix $Z_{crack\_diff}$ and the crack plane matrix $\Delta_{crack\_diff}$.

$$L = \begin{bmatrix} lv(0, 0) \\ \vdots \\ lv(i, j) \\ \vdots \\ lv(n, m) \end{bmatrix} \quad (6)$$

Here, when lv (i, j) is one, it is defined as "a crack exists", and when lv (i, j) is zero, it is defined as "no crack", and a value of zero or one is to be taken.

Next, probability distribution of the displacement and the load of the crack candidate plane 7fc is obtained via the latent variable showing sparsity of the displacement and the load, the displacement and the load in the crack candidate plane 7fc having the reciprocity. This is defined to be a prior distribution (step S3240). Here, the reciprocity means a relationship in which, when one exists, the other does not exist, and when the other exists, the one does not exist, and the one and the other do not exist simultaneously.

Here, assuming that the probability distribution is a normal distribution, expected values and covariances for the displacement and the load in the crack candidate plane 7fc are assumed to be functions of the latent variable. Let $\Delta_{ex}$ and $\Delta_{cov}$ denote a vector of the expected values of the displacement and a matrix of the covariances, respectively, and let $Z_{ex}$ and $Z_{cov}$ denote a vector of the expected values of the load and a matrix of the covariances, respectively. Components of each of the vectors and the matrices are functions of the latent variable, and the expected values and variances are assumed to be appropriate at the crack 9 and non-crack portions. A posterior distribution is expressed by Equation (7).

$$p(\Delta_{ans}|L) = \text{Norm}(\Delta_{ans}|\Delta_{ex},\Delta_{cov})\text{Norm}(Z_{ans}|Z_{ex},Z_{cov}) \quad (7)$$

Next, an expected value of the noise in the strain distribution of the observation result is defined as $E_{noiseex}$, and a variance of the noise at the time of measurement is defined as $E_{noisecov}$, probability distribution of the difference between estimated displacement distribution $\Delta_{ans}$ of the crack candidate plane 7fc and an expected value $E_m$ of the observation result is obtained as Equation (8) using the forward coefficient matrix D of the estimation model. This is defined as a likelihood distribution (step S3250).

$$L(\Delta_{ans}|E_m)=\text{Norm}(D\Delta_{ans}-E_m|E_{noiseex},E_{noisecov}) \quad (8)$$

Finally, the displacement distribution $\Delta_{ans}$ is estimated by Bayesian estimation so as to satisfy Equation (9) below. Here, using the JE-MAP estimation as a Bayesian estimation that maximizes a posterior probability, the displacement distribution $\Delta_{ans}$ is estimated (step S3260).

$$\Delta_{ans} = \arg\max_{\Delta_{ans}}\{L(\Delta_{ans}\,|\,E_m)p(\Delta_{ans}\,|\,L)\} \quad (9)$$

The strain distribution on the surface is obtained from the obtained displacement distribution $\Delta_{ans}$ and the forward coefficient matrix D, and the difference from the expected value $E_m$ of the observation result is calculated using Equation (10) below (step S3270).

$$|\Delta_{ans}D-E_m|\leq\lambda \quad (10)$$

Then, it is determined whether or not the calculated difference value is equal to or less than a reference value $\lambda$ which is predetermined for the determination of convergence (step S3280). If the difference value exceeds the reference value $\lambda$ ("No" in step S3280), the process proceeds to step S3240 where the latent variable is obtained on the basis of the displacement distribution $\Delta_{ans}$ which is the posterior distribution, and the calculations are repeated. If the difference value is less than or equal to the reference value $\lambda$ ("Yes" in step S3280), it is determined that the displacement distribution $\Delta_{ans}$ obtained at the time has converged, and the size and position of the crack 9 are obtained from the converged displacement distribution $\Delta_{ans}$ in the crack candidate plane 7fc (step S3290).

Information on the size and position of the crack 9 that are obtained is output to the analysis result output unit 4, and the process proceeds to an analysis result output phase (step S4000). Thus, the crack state analysis phase ends, and the process proceeds to the analysis result output phase (step S4000) by the analysis result output unit 4. In the analysis result output phase, the position and the size of the crack 9 output from the crack state analysis unit 3 are displayed as the inspection result.

Note that, as shown in FIG. 10, a part for performing calculation processing in the crack estimation device 1 according to Embodiment 1, particularly the model generation unit 2 and the crack state analysis unit 3, may be configured with a single hardware 10 including a processor 101 and a storage device 102. Although not shown, the storage device 102 includes a volatile storage device such as a random access memory, and a non-volatile auxiliary storage device such as a flash memory. An auxiliary storage device of a hard disk may be provided in place of the flash memory. The processor 101 executes a program input from the storage device 102.

In this case, a program is input from the auxiliary storage device to the processor 101 via the volatile storage device. Further, the processor 101 may output data such as calculation results to the volatile storage device of the storage device 102 or may store the data in the auxiliary storage device via the volatile storage device. The hardware 10 may be connected to a measuring instrument, or the results of the strain measurement may be brought back for use in data processing. In other words, the crack estimation method according to Embodiment 1 may be configured to be executed by the hardware 10. Of course, the configuration can also be applied to the crack estimation device 1, the crack estimation method, and the inspection method of the rotating machine according to the following embodiments.

In addition, in the above description, the target structure 7 is assumed to be the flat plate and shown in an xyz orthogonal coordinate system, but there is no limitation on the above. For example, as shown in FIG. 11A, it can be also applied to the target structure 7 of a cylinder with a cylindrical coordinate system having coordinates RθZ. In this case, x shown in FIG. 4A and FIG. 4B corresponds to R, y corresponds to θ, and z corresponds to Z. The cylindrical structure to be a target is a structure in which the internal pressure Pi is applied to the inner circumferential surface 7fi, such as a shrink-fit portion shown in FIG. 11B, and the shape of the surface changes caused by the occurrence of cracks in the portion hidden from the surface.

As an example of the target structure to which the cylindrical coordinate system is applied, there is a shrink-fitted portion of a retaining ring to a rotor iron core, the retaining ring being shrink-fitted to an end of a rotor of a rotating machine.

Embodiment 2

In Embodiment 1 described above, an example in which the crack state is estimated from the strain change as the deformation of the observation plane is shown, but this is not a limitation. Also, it is not possible to have all the crack shapes to be detected learned. In Embodiment 2, an example in which a crack state is estimated from a displacement change and an angle change will be described. In particular, by efficient learning with a less amount of crack data, estimation of the position and the size of a crack in a portion hidden from any surface from the change of an observation plane should be made possible.

FIG. 12 and FIG. 13 each show a memory structure for the storing as described in FIG. 5 of Embodiment 1 when the estimation model is generated, in a crack estimation device or a crack estimation method according to Embodiment 2, FIG. 12 shows a memory structure for storing information on a displacement change of the observation plane, and FIG. 13 shows a memory structure for storing information on an angle change of the observation plane. Note that, in the crack estimation device or the crack estimation method according to Embodiment 2, the operation other than those related to the memory structure (step S2240 to step S2290) is the same as those described in Embodiment 1. Therefore, parts different from those of Embodiment 1 will be mainly described, and the drawings used in Embodiment 1 will be referred to.

Also in the case where the displacement change is used, as shown in FIG. 12, a column vector Dis(0, 0) of the displacement change of the observation plane 7fo is such that the displacement change data of the nodes of the observation plane 7fo is arranged in the order determined in the shape model setting step S2120. $d_{i\_j}(k, l)$ in the column vector Dis(0, 0) indicates the displacement change of the node at the coordinates (k, l) in the observation plane 7fo. Further, the column vector Dis(i, j) is generated with the coordinates (i, j) in the crack candidate plane 7fc as the information on the position (coordinates) for the learning at which the crack 9 is made to occur, and components in the column vector are indicated by $d_{i\_j}(k, l)$. $d_{i\_j}(k, l)$ indicates the displacement change at the node of coordinates (k, l) in the crack candidate plane 7fc in a result of the structural analysis in which the node of coordinates (i, j) in the crack candidate plane 7fc is regarded to be in the crack state. This column vector is arranged in rows in the order of the position where the crack 9 occurs, determined in the shape model setting step S2120, to generate a matrix $Dis_{measure}$.

Also in the case where the angle change is used, as shown in FIG. 13, a column vector A(0,0) of the displacement change of the observation plane 7fo is such that the angle change data of the nodes of the observation plane 7fo is arranged in the order determined in the shape model setting step S2120. $a_{i\_j}(k, l)$ in the column vector A(0,0) indicates the angle change of the node at the coordinates (k, l) in the observation plane 7fo. Further, the column vector of A (i, j) is generated with the coordinates (i, j) in the crack candidate plane 7fc as the information on the position (coordinates) for the learning at which the crack 9 is made to occur, and components in the column vector are indicated by $a_{i\_j}(k, l)$. $a_{i\_j}(k, l)$ indicates the displacement angle change of the node of coordinates (k, l) in the crack candidate plane 7fc as a result of structural analysis in which the node of coordinates (i, j) in the crack candidate plane 7fc is regarded to be in the crack state. This column vector is arranged row by row in the order of the position where the crack 9 occurs, determined in the shape model setting step S2120, to generate a matrix $A_{measure}$.

In this way, by using the displacement change or the angle change, it is possible to automate the portion for generating the learning data corresponding to all the shapes of the crack 9 occurring in the crack candidate plane 7fc. As a result, it is possible to estimate the position and the size of the crack 9 in the portion hidden from any surface from the change of the observation plane 7fo by efficient learning with a less amount of crack data. Furthermore, by using not only the strain change but also the displacement change and the angle change as the deformation of the observation plane 7fo, the types of the measurement method can be extended, and measurement can be performed in a shorter time and with higher accuracy than the strain measurement.

Embodiment 3

In Embodiment 1 or Embodiment 2, since deformation caused by the cracks needs to be occurring in the observation plane at the time of inspection, the target structure is limited to a structure in which a force is being applied beforehand, such as a shrink-fitted portion. However, even when a force is not being applied to the target structure beforehand, the same measurement can be performed by applying a constant load to the target structure at the condition of no crack and at the time of inspection. In a crack estimation device or a crack estimation method according to Embodiment 3, even when a force is not being applied to the target structure beforehand, the crack state can be estimated by applying a constant load to the target structure.

Figure 14:
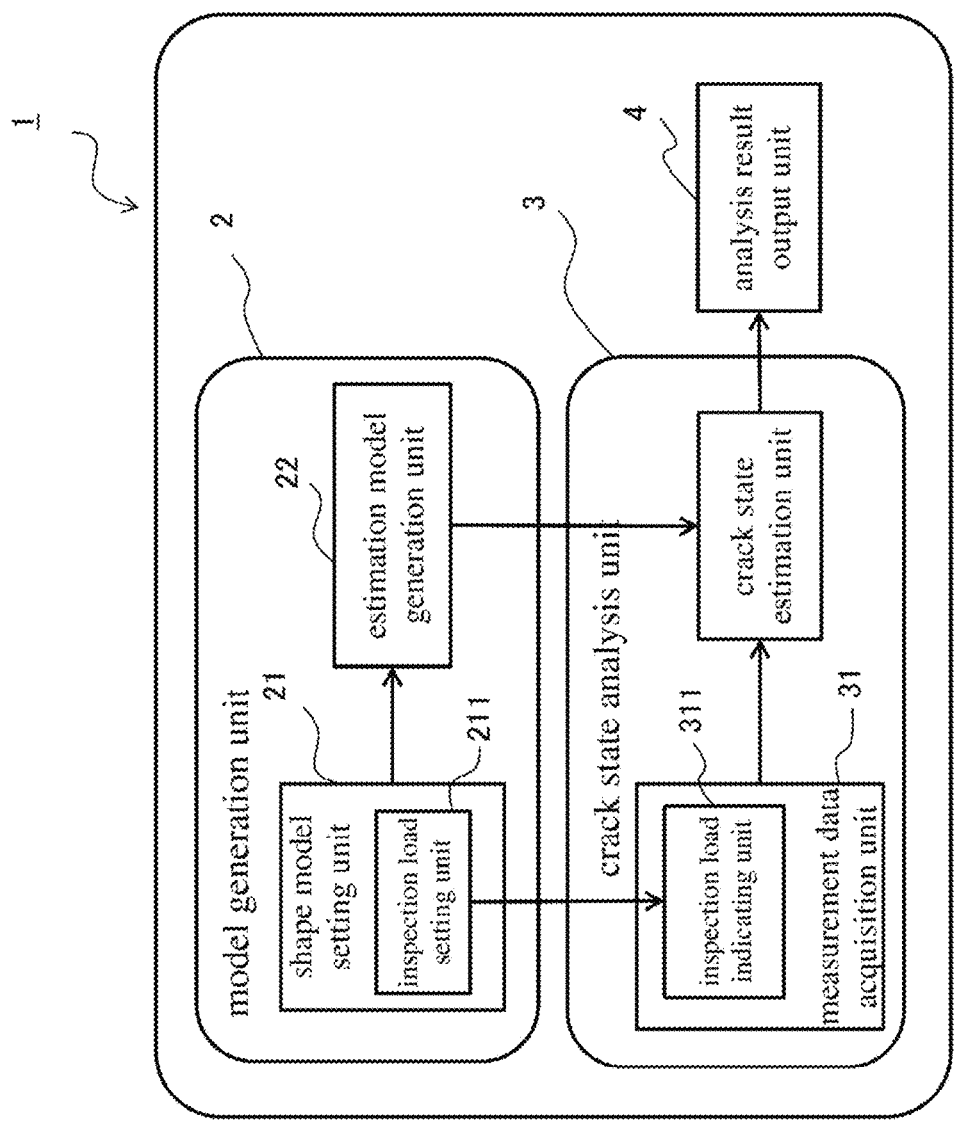
FIG. 14 is a block diagram for explaining a configuration of a crack estimation device according to Embodiment 3.
Figure 15:
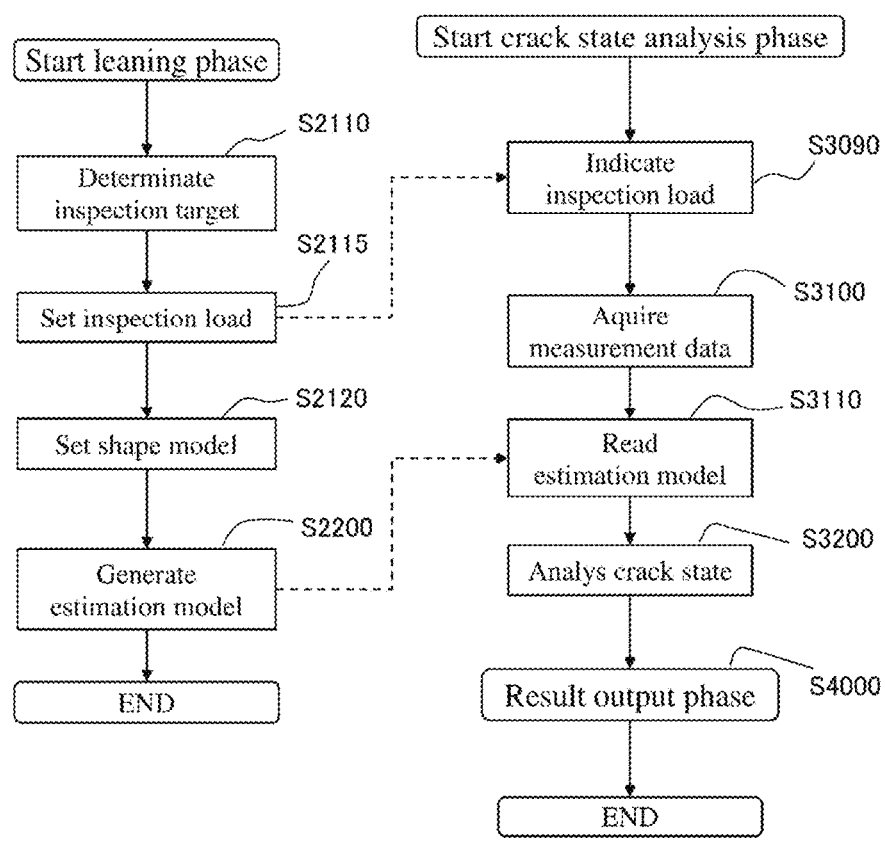
FIG. 15 is a flowchart showing operation of the crack estimation device or a crack estimation method according to Embodiment 3.

FIG. 14 and FIG. 15 are those for explaining a structure and operation of the crack estimation device, the crack estimation method, or an inspection method of the rotating machine according to Embodiment 3, FIG. 14 is a block diagram for explaining the structure of the crack estimation device, and FIG. 15 is a flowchart showing the operation of the crack estimation device or the crack estimation method. Note that, in the crack estimation device or the crack estimation method according to Embodiment 3, the description except for the configuration of the shape model setting unit and the measurement data acquisition unit described in Embodiment 1 and Embodiment 2 and operation relating to an inspection load (step S2115, step S3090) are the same as those described in Embodiment 1. Therefore, parts different from those of Embodiment 1 will be mainly described, and the drawings used in Embodiment 1 will be referred to.

As shown in FIG. 14, the shape model setting unit 21 is provided with an inspection load setting unit 211 for setting a magnitude and a position of a load to be applied as an external force to the target structure 7. Further, the measurement data acquisition unit 31 is provided with an inspection load indicating unit 311 for displaying the size and position of the load to be applied to the target structure 7, which is set by the inspection load setting unit 211.

Then, as shown in FIG. 15, in the learning phase, an inspection load setting step S2115 for setting the magnitude and position of the load for the inspection is provided, and in a shape model setting step S2120, the set inspection load is added to the boundary condition at the time of the structural analysis. Further, in the crack state analysis phase, an inspection load instruction step S3090 is provided, and in the measurement data acquisition step S3100, an external force is applied to the target structure 7 at the instructed magnitude and position to measure the state of the surface. This makes it possible to inspect the target structures 7 to which no force has been applied beforehand and expands the range of the target structures 7 that can be inspected.

Note that the functional configuration of the inspection load indicating unit 311 may be changed to a functional configuration in which a load is automatically applied to the target structure 7 in addition to the load display, and in this case, the inspection load instruction step S3090 may be read as an inspection load applying step.

Since a load is applied to the target structure 7 at the magnitude and position set at the time of inspection in this manner, the inspection of the target structure to which a force is not being applied beforehand can be performed, and the target which can be inspected can be expanded.

Embodiment 4

Figure 16:
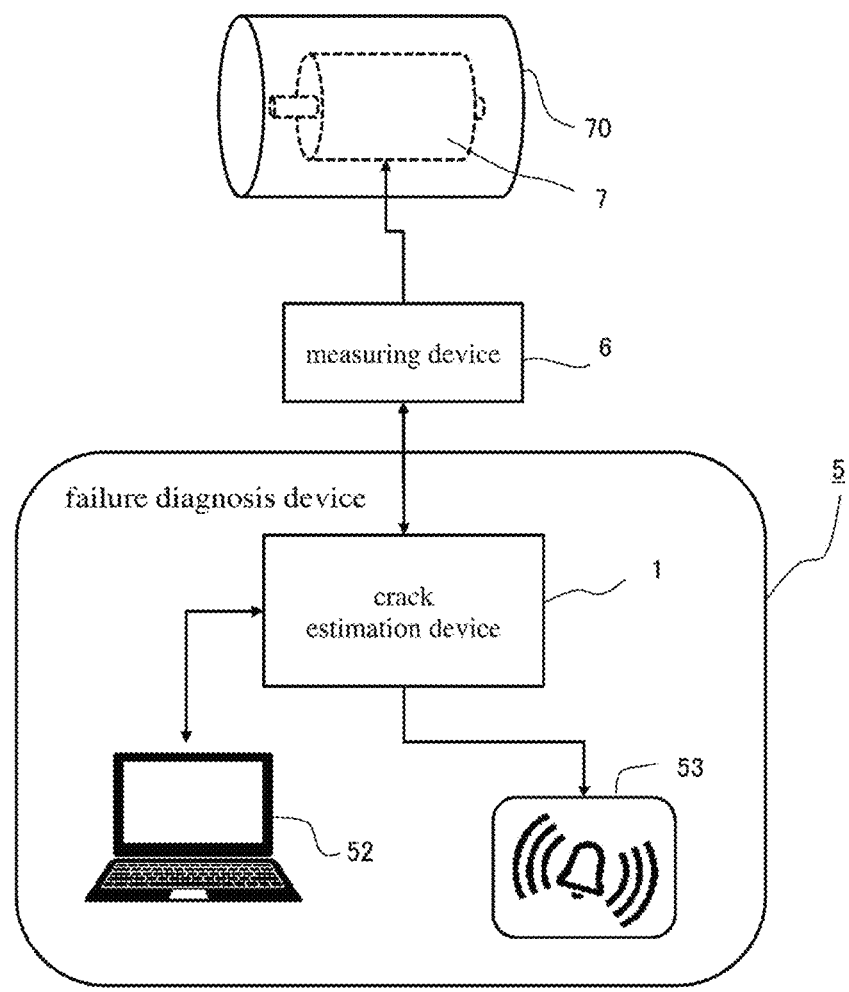
FIG. 16 is a diagram showing an overall configuration of a failure diagnosis device according to Embodiment 4.
Figure 17:
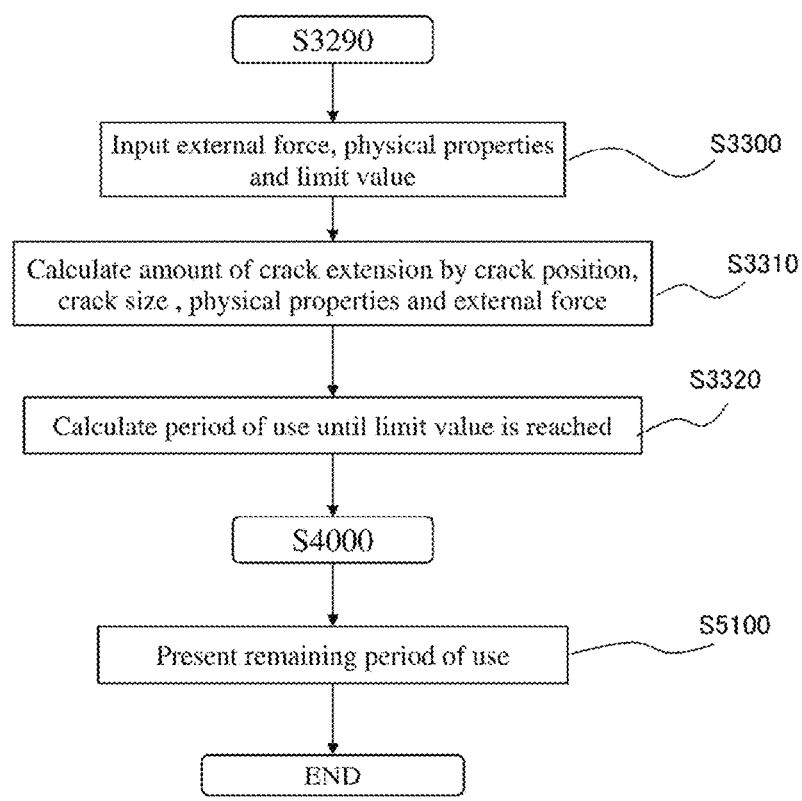
FIG. 17 is a flowchart showing additional operation as the failure diagnosis device or additional steps as a failure diagnosis method for a rotating machine according to Embodiment 4.

In the above-described embodiments, the configuration and the operation necessary for estimating the crack state of the target structure have been described. In Embodiment 4, a failure diagnosis device for performing failure diagnosis of a rotating machine as a target structure and a failure diagnosis method of the rotating machine will be described. FIG. 16 and FIG. 17 are those for explaining a configuration and operation of the failure diagnosis device and the failure diagnosis method for the rotating machine according to Embodiment 4, FIG. 16 is a diagram showing an overall configuration of the failure diagnosis device, and FIG. 17 is a flowchart showing additional steps for the operation described in the crack state estimation device or the crack estimation method as the operation of the failure diagnosis device or the failure diagnosis method for the rotating machine.

Note that, in the failure diagnosis device or the failure diagnosis method for the rotating machine according to Embodiment 4, components and operation necessary for the failure diagnosis are added to the crack estimation device or the crack estimation method described in any one of Embodiment 1 to Embodiment 3. Therefore, the description in Embodiment 1 to Embodiment 3 will be referred to, and additional parts will be mainly described.

As shown in FIG. 16, the failure diagnosis device 5 according to Embodiment 4 is provided with the crack estimation device 1 described in Embodiment 1 to Embodiment 3, and a terminal 52 having functions for inputting operating conditions, physical properties, and the like necessary for the failure diagnosis and for displaying a diagnosis result. And the system is configured such that measurement data can be acquired from a measuring device 6 for measuring a surface state of a rotor in the rotating machine 70 which is the target structure 7, and thus the size and position of the crack 9 are estimated from the surface state of the rotor. Further, by using, for example, an external force applied to the rotor, physical properties of the rotor, and the limit value that are input from the terminal 52, the crack estimation device 1 calculates the period of use until the limit value is reached. Note that an alarm device 53 will be described in Embodiment 5, which will be described later.

Thus, as shown in FIG. 17, a process (step S3300) is added in which data of the external force applied to the target structure 7 such as the rotor, the physical properties of the target structure, and the limit value for the size and position of a crack which make the target structure 7 unusable are input, for example, from the terminal 52. Note that these data are available at a product design stage.

Then, a step (step S3310) is added in which an amount of crack extension under the use conditions of the target product is calculated by the crack state estimation unit 32 from the position and size of the crack 9 calculated in step S3290 and the input data using the knowledge on fracture mechanics. Note that regarding the calculation of the amount of extension, the amount of extension may be estimated from not only the knowledge on fracture mechanics but also the estimation result of the size and position of the crack 9 in the time series. Further, a step (step S3320) is added to calculate the period of use until the crack 9 reaches the size and the location that make the target structure unusable.

Thus, the analysis result output unit 4 outputs information on the remaining period of use to the terminal 52 in addition to the output of the estimation result (step S4000). The terminal 52 presents information containing the remaining period of use in accordance with the output contents from the analysis result output unit 4 (step S5100). Note that the function of the terminal 52 can be substituted by the analysis result output unit 4 described in Embodiment 1 to Embodiment 3.

As a result, in addition to the position and size of the crack 9, the remaining period of use of equipment can be understood, the equipment can be repaired or renewed in a planned manner, and the device can function as the failure diagnosis device 5 or the failure diagnosis method for the rotating machine.

Embodiment 5

Figure 18:
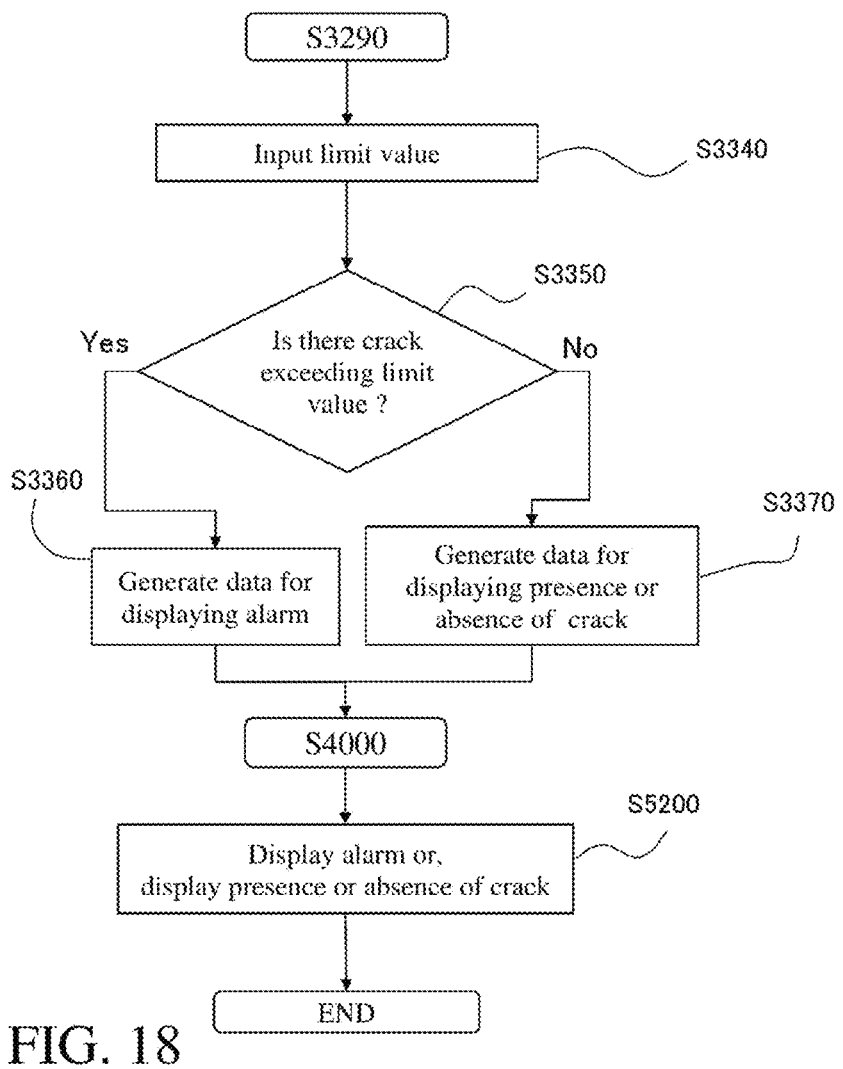
FIG. 18 is a flowchart showing additional operation as a failure diagnosis device or additional steps as a failure diagnosis method for a rotating machine according to Embodiment 5.

In Embodiment 4 described above, an example in which the remaining period of use of the equipment is presented as a failure diagnosis has been described, but this is not a limitation. In Embodiment 5, an alarm device is provided in order to more positively present a failure sign. FIG. 18 is a flowchart for explaining operation of a failure diagnosis device and a failure diagnosis method of a rotating machine according to Embodiment 5, and shows additional steps for the operation described in the crack estimation device or the crack estimation method, as the operation of the failure diagnosis device or the failure diagnosis method of the rotating machine.

Note that, in the failure diagnosis device or the failure diagnosis method of the rotating machine according to Embodiment 5, a configuration and operation necessary for the failure diagnosis are added to the crack estimation device or the crack estimation method described in any one of Embodiment 1 to Embodiment 3. Therefore, the description in Embodiment 1 to Embodiment 3 will be referred to, and the additional parts will be mainly described. In addition, FIG. 16 used in Embodiment 4 is referred to as the configuration of the failure diagnosis device.

The failure diagnosis device 5 according to Embodiment 5 includes the alarm device 53 for issuing an alarm in addition to the contents described referring to FIG. 16 of Embodiment 4. Further, the size and position of the crack 9 that can be used as the limit value are inputted from the terminal 52. Then, the crack estimation device 1, for example, determines whether or not any of the estimated cracks 9 exceeds the limit value using the limit value input from the terminal 52.

Thus, as shown in FIG. 18, a step of inputting the limit value (step S3340) is added after step S3290. Further, a step (step S3350) is added for determining whether or not a crack 9 exceeding a size (limit value) unsuitable for the use exists at a certain position from the information based on the position and size of the crack 9 calculated in step S3290 and data of the limit value that is input.

If there is a crack 9 exceeding the limit value ("Yes" in step S3350), display data for displaying an alarm to urge the stop of the use is generated (step S3360). In contrast, when there is no crack 9 exceeding the limit value ("No" in step S3350), display data for displaying the presence or absence of a crack or the number of cracks is generated (step S3360)

Thus, the analysis result output unit 4 outputs the alarm or the display data such as the presence or absence of a crack, to the alarm device 53 (step S4000). The alarm device 53 displays the alarm indicating the stop of the use or the presence or absence of a crack in accordance with the output contents from the analysis result output unit 4 (step S5200). Note that the function of the alarm device 53 can be substituted by the analysis result output unit 4 described in Embodiment 1 to Embodiment 3.

Thus, it is possible to quickly determine the stop of the use of the equipment. Note that the period of use until the limit value is reached described in Embodiment 4 or the estimated size and position of the crack 9 may be displayed on the terminal 52.

Embodiment 6

The crack candidate plane 7$fc$ described in Embodiment 1 to Embodiment 5 may be set as described below. The distribution of occurring stress of the target structure 7 is obtained beforehand by measurement or a structural analysis, an appropriate evaluation stress is selected to determine the occurrence location of the crack 9 on the basis of the material and the stress distribution, and the point where the stress is maximum is taken as an occurrence location of the crack. Further, the crack candidate plane 7$fc$ is set so as to be a plane that is perpendicular to the maximum principal stress direction at the occurrence location and penetrates a plane facing the occurrence location of the crack 9 in the target structure 7. With this setting, the learning data can be prepared before the inspection is performed, and the time required for the inspection can be shortened.

Note that, although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component shown in another embodiment are included.

As described above, the crack estimation device 1 according to each embodiment is configured to include the shape model setting unit 21 to set the shape model of the target structure 7 to be inspected to which an external force (for example, tensile load Lt, bending moment Mb, internal pressure Pi, etc.) is applied, the crack candidate plane 7*fc* in which a crack is expected to occur in a portion hidden from surfaces of the shape model, and the observation plane 7*fo* to be measured among the surfaces of the shape model, the estimation model generation unit 22 to generate a matrix for estimating the state of the crack candidate plane 7*fc* from the state of the observation plane 7*fo* using matrices for associating the state of the crack candidate plane 7*fc* with the state of the observation plane 7*fo*, the matrices being obtained by a numerical analysis of a structural analysis model generated from the shape model, and the crack state analysis unit 3 to estimate the position and size of the crack 9 by obtaining the distribution of the load and displacement in the crack candidate plane 7*fc* at the same time by the probabilistic inference through the application of an observation plane deformation vector indicating the deformation of the observation plane 7*fo* obtained from actual measurement values of the observation plane 7*fo*, the estimation model, and the latent variable indicating the presence or absence of the crack 9 in the crack candidate plane 7*fc*. Therefore, the size and position of the crack 9 that occurs in the portion hidden from the surfaces where observation is difficult can be accurately estimated from the shape change of the observation plane 7*fo* which can be measured directly.

In particular, the crack state analysis unit 3 is configured to determine the size and position of the crack 9 from the posterior distribution (displacement distribution $\Delta_{ans}$) at the time when the posterior distribution (displacement distribution $\Delta_{ans}$) is updated and converged via the latent variable, the prior distribution being defined to be the probability distribution of the displacement of the crack candidate plane 7*fc* obtained at the same time with the load via the latent variable showing the sparsity of the displacement and load having the reciprocity, the posterior distribution being defined to be the probability distribution (displacement distribution $\Delta_{ans}$) of the displacement of the observation plane 7*fo* calculated by the prior distribution and the estimation model. Therefore, the size and position of the crack 9 that occurs in the portion hidden from the surfaces where observation is difficult can be reliably estimated with high accuracy.

The displacement distribution $\Delta_{ans}$ can be estimated by a simple calculation when the Bayesian estimation is used for the probabilistic inference, especially if the MAP estimation thereof is used.

When any one of the displacement change, the strain change, and the angle change of the observation plane 7*fo* is used for the observation plane deformation vector, the application can be made to a structure of various shapes as the target structure 7 for estimating the crack 9.

The external force is the inspection load applied at the time of inspection of the target structure 7, and when the inspection load setting unit 211 to set the position and magnitude of the inspection load and the inspection load indicating unit 311 to display the position and magnitude of the set inspection load at the time of inspection are provided, the application can be made to a structure to which no external force is applied because of the structure, as the target structure 7 for estimating the crack 9.

Further, the failure diagnosis device 5 of the present application includes the crack estimation device 1 described above and the terminal 52, the crack estimation device 1 being connected to the measuring instrument (measuring device 6) for measuring the observation plane 7*fo* of the target structure 7 and including the measurement data acquisition unit 31 which obtains measurement values from the measuring instrument (measuring device 6), the terminal 52 receiving information on the limit condition of the crack in the target structure 7, outputting the received information on the limit condition to the crack estimation device, and displaying the analysis result of the crack estimation device 1. The crack state analysis unit 3 is configured to determine whether or not the size and position of the crack 9 that are obtained exceed the limit condition and display a failure occurrence warning on the terminal 52 (including alarm device 53) if the size and position exceed the limit condition, so that the failure of the target structure 7 can be accurately diagnosed and announced.

Or the failure diagnosis device 5 of the present application includes the crack estimation device 1 described above and the terminal 52, the crack estimation device 1 being connected to the measuring instrument (measuring device 6) for measuring the observation plane 7*fo* of the target structure 7 and including the measurement data acquisition unit 31 which obtains measurement values from the measuring instrument (measuring device 6), the terminal 52 receiving member information containing force applied to the target structure 7 during the operation of the equipment having the target structure 7 and physical properties of the material constituting the target structure 7, outputting the received member information to the crack estimation device 1, and displaying the analysis result of the crack estimation device 1. The crack state analysis unit 3 is configured to determine a propagation lifetime of the crack 9 from the size and position of the crack 9 that are obtained and the member information and display information on the remaining period of use on the terminal 52, so that the remaining use period until the equipment having the target structure 7 fails can be accurately diagnosed and announced.

Further, the crack estimation method according to each embodiment is configured to include the shape model setting step (step S2120) for setting the shape model of the target structure 7 to be inspected to which an external force (for example, tensile load Lt, bending moment Mb, internal pressure Pi, etc.) is applied, the crack candidate plane 7*fc* in which a crack is expected to occur in a portion hidden from the surfaces of the shape model, and the observation plane 7*fo* to be measured among the surfaces of the shape model, the estimation model generation step (step S2200 (steps S2210 to S2320)) for generating the matrix for estimating the state of the crack candidate plane 7*fc* from the state of the observation plane 7*fo* using the matrices that associates the state of the crack candidate plane 7*fc* with the state of the observation plane 7*fo*, the matrices being obtained by a numerical analysis of a structural analysis model by sequentially changing the boundary condition of the crack candidate plane 7*fc* in the structural analysis model generated from the shape model, the step (step S3100) for receiving actual measurement values of the observation plane 7*fo*, and the crack state analysis step (step S3200 (steps S3210 to S3290)) for estimating the position and size of the crack 9 by obtaining the distribution of the load and displacement in the crack candidate plane 7fc at the same time by the probabilistic inference through the application of the observation plane deformation vector indicating the deformation of the observation plane 7fo obtained from the measurement values, the estimation model, and the latent variable indicating the presence or absence of the crack 9 in the crack candidate plane 7fc. Therefore, the size and position of the crack 9 that occurs in the portion hidden from the surfaces where observation is difficult can be accurately estimated from the shape change of the observation plane 7fo which can be measured directly.

In particular, the crack state analysis step (step S3200) is configured as follows. The probability distribution of the displacement of the crack candidate plane 7fc estimated from the observation plane deformation vector and the forward coefficient matrix D via the latent variable is calculated as the likelihood distribution (step S3250), the forward coefficient matrix D mapping from the crack plane matrix $\Delta_{crack\_diff}$ representing the analysis result of the crack candidate plane 7fc in a matrix to the observation plane matrix $E_{measure}$ representing the analysis result of the observation plane 7fo in a matrix and being included in the matrices constituting the estimation model, the observation plane deformation vector representing the deformation of the observation plane 7fo of the target structure 7, and the probability distribution of the load and displacement of the crack candidate plane 7fc are estimated at the same time via the latent variable showing the sparsity of the load and displacement to calculate the obtained probability distribution of the displacement of the crack candidate plane 7fc as the prior distribution (step S3240), the load and displacement having the reciprocity, and then the displacement distribution of the crack candidate plane 7fc is calculated by the probabilistic inference from the likelihood distribution and the prior distribution (step S3260). Therefore, the size and position of the crack 9 can be reliably estimated with high accuracy.

Further, the estimation model generation step (step S2200) is configured to include the step (step S2260) in which a structural analysis model is generated from the shape model, and from the analysis result obtained by performing a numerical analysis on all portions of the crack candidate plane 7fc by sequentially changing the boundary condition at which the crack 9 occurs, information on crack portions that are made to occur and the analysis result of the crack candidate plane 7fc are stored in association with the analysis result of the observation plane 7fo, and the step (steps S2290 to S2320) in which the forward coefficient matrix D and the stiffness matrix G are calculated to output them as the associated information which are to be used for the estimation, the forward coefficient matrix D mapping from the crack plane matrix $\Delta_{crack\_diff}$ representing the stored analysis result of the observation plane in a matrix to the observation plane matrix $E_{measure}$ representing the analysis result of the observation plane 7fo in a matrix, the stiffness matrix G representing the relationship between the load and displacement of the analysis result of the crack candidate plane 7fc in a matrix. Therefore, the crack 9 can be estimated by efficient learning with a less amount of crack data.

In the estimation model generation step (step S2200), by performing a numerical analysis in which the shape or the condition is changed such that release of connections among a plurality of elements Efc obtained by dividing the crack candidate plane 7fc or the displacement of the crack candidate plane 7fc results in the same as in the case where the crack 9 occurs, it is also possible to estimate the crack 9 by efficient learning with a less amount of crack data.

The shape model setting step (step S2100) is configured to include the step for obtaining the distribution of the occurring stress in the target structure 7 from measurement or a structural analysis, the step for selecting an appropriate evaluation stress for determining the occurrence location of the crack 9 on the basis of the material constituting the target structure 7 and the distribution of the occurring stress, and the step for determining the crack candidate plane 7fc so as to be a plane that is perpendicular to the maximum principal stress direction at the occurrence location and penetrates a plane facing the occurrence location in the target structure 7, the occurrence location of the crack 9 being the point where the occurring stress is maximum. Therefore, the learning data can be prepared before the inspection is performed and the time required for the inspection can be shortened.

Further, according to the failure diagnosis method of the rotating machine in the present application, the target structure 7 is a rotating machine member including any one of the rotor constituting the rotating machine 70 and the retaining ring shrink-fitted to the end of the rotor, and is configured to include each of the steps performed by the above-mentioned crack estimation method, the step (step S3300) for receiving the member information containing force applied to the rotating machine member during the operation of the rotating machine 70 and physical properties of the material constituting the rotating machine member, the step (steps S3310 to S3320) for calculating the remaining period of use by determining the propagation lifetime of the crack using information on the size and position of the crack 9 obtained in the crack state analysis step (step S3200) and target structure information, and the step (step S5100) for displaying the calculated period of use. Therefore, the remaining period until the rotating machine 70 fails can be accurately diagnosed and announced.

Or, according to the failure diagnosis method of the rotating machine of the present application, the target structure 7 is the rotating machine member including any one of the rotor constituting the rotating machine 70 and the retaining ring shrink-fitted to the end of the rotor, and is configured to include the steps performed by the above-described crack estimation method, the step (step S3340) for receiving information on the limit condition of the crack that occurs in the rotating machine member, and the step (steps S3350 to S3370, step S5200) for determining whether or not the size and position of the crack 9 obtained in the crack state analysis step (step S3200) exceed the limit condition and notifying the occurrence of a failure when the size and position exceed the limit condition. Therefore, the failure of the rotating machine 70 can be accurately diagnosed and notified.

DESCRIPTION OF REFERENCE NUMERALS AND SIGNS 1 crack estimation device, 2 model generation unit, 21 shape model setting unit, 211 inspection load setting unit, 22 estimation model generation unit, 3 crack state analysis unit, 31 measurement data acquisition unit, 311 inspection load indicating unit, 32 crack state estimation unit, 5 failure diagnosis device, 52 terminal, 53 alarm device, 6 measuring device (measuring instrument), 7 target structure, 70 rotating machine, 7fc crack candidate plane, 7fo observation plane, 9 crack, D forward coefficient matrix, Efc element, Efo element, $E_{measure}$ observation plane matrix, G stiffness matrix, Lt tensile load (external force), Mb bending moment (external force), Pi internal pressure (external force), $\Delta_{ans}$ displacement distribution, $\Delta_{crack\_diff}$ crack plane matrix, $\lambda$ reference value (determination criteria)

The invention claimed is:
1. A failure diagnosis device, comprising:
   a crack estimation device including
      a shape model setting circuitry to set a shape model of a target structure to be inspected to which an external force is applied, a crack candidate plane in which a crack is expected to occur in a portion hidden from surfaces of the shape model, and an observation plane to be measured among the surfaces of the shape model,
      an estimation model generator to generate a matrix for estimating a state of the crack candidate plane from a state of the observation plane using matrices for associating the state of the crack candidate plane with the state of the observation plane, the matrices being obtained by a numerical analysis of a structural analysis model generated from the shape model, and
      a crack state analyzer to estimate a position and a size of the crack by obtaining a distribution of load and displacement in the crack candidate plane at the same time by probabilistic inference through application of an observation plane deformation vector indicating deformation of the observation plane obtained from actual measurement values of the observation plane, the matrix, and a latent variable indicating presence or absence of the crack in the crack candidate plane, the crack state analyzer outputting the position and size of the crack estimated, the crack estimation device being connected to a measuring instrument for measuring the observation plane of the target structure and including the measurement data acquisition circuitry which obtains the measurement values from the measuring instrument,
      the crack state analyzer determining the size and the position of the crack from a posterior distribution at a time when the posterior distribution is updated and converged via the latent variable, a prior distribution being defined to be a probability distribution of the displacement of the crack candidate plane obtained at the same time with the load via the latent variable showing sparsity of the displacement and the load having reciprocity, the posterior distribution being defined to be a probability distribution of displacement of the observation plane calculated from the prior distribution and the matrix; and
   a terminal to receive information on a limit condition of a crack in the target structure, to output the received information on the limit condition to the crack estimation device, and to display an analysis result of the crack estimation device, wherein
   the crack state analyzer determines whether or not the size and the position of the crack that are obtained exceed the limit condition and displays a failure occurrence warning on the terminal if the size and the position exceed the limit condition.
2. The failure diagnosis device according to claim 1, wherein a Bayesian estimation is used for the probabilistic inference.
3. The failure diagnosis device according to claim 1, wherein any one of a displacement change, a strain change, and an angle change of the observation plane is used for the observation plane deformation vector.
4. The failure diagnosis device according to claim 1, wherein
   the external force is an inspection load applied at a time of inspection of the target structure; and
   an inspection load setting circuitry to set a position and a magnitude of the load and an inspection load indicator to display the position and the magnitude of the set inspection load at the time of inspection are further provided.
5. The failure diagnosis device according to claim 1, wherein:
   the terminal receives member information containing force applied to the target structure during operation of equipment having the target structure and physical properties of a material constituting the target structure, outputs the received member information to the crack estimation device, and displays an analysis result of the crack estimation device, wherein
   the crack state analyzer determines a propagation lifetime of the crack from the size and the position of the crack that are obtained and the member information and displays information on a remaining period of use on the terminal.
6. A failure diagnosis device, comprising:
   a crack estimation device including
   a shape model setting circuitry to set a shape model of a target structure to be inspected to which an external force is applied, a crack candidate plane in which a crack is expected to occur in a portion hidden from surfaces of the shape model, and an observation plane to be measured among the surfaces of the shape model,
   an estimation model generator to generate a matrix for estimating a state of the crack candidate plane from a state of the observation plane using matrices for associating the state of the crack candidate plane with the state of the observation plane, the matrices being obtained by a numerical analysis of a structural analysis model generated from the shape model, and
   a crack state analyzer to estimate a position and a size of the crack by obtaining a distribution of load and displacement in the crack candidate plane at the same time by probabilistic inference through application of an observation plane deformation vector indicating deformation of the observation plane obtained from actual measurement values of the observation plane, the matrix, and a latent variable indicating presence or absence of the crack in the crack candidate plane, the crack state analyzer outputting the position and size of the crack estimated, the crack estimation device being connected to a measuring instrument for measuring the observation plane of the target structure and including the measurement data acquisition circuitry which obtains the measurement values from the measuring instrument,
   the crack state analyzer determining the size and the position of the crack from a posterior distribution at a time when the posterior distribution is updated and converged via the latent variable, a prior distribution being defined to be a probability distribution of the displacement of the crack candidate plane obtained at the same time with the load via the latent variable showing sparsity of the displacement and the load having reciprocity, the posterior distribution being defined to be a probability distribution of displacement of the observation plane calculated from the prior distribution and the matrix; and
   a terminal to receive member information containing force applied to the target structure during operation of equipment having the target structure and physical properties of a material constituting the target structure, to output the received member information to the crack estimation device, and to display an analysis result of the crack estimation device, wherein the crack state analyzer determines a propagation lifetime of the crack from the size and the position of the crack that are obtained and the member information and displays information on a remaining period of use on the terminal.

7. A failure diagnosis method of a rotating machine, comprising:

a shape model setting step of setting a shape model of a target structure to be inspected to which an external force is applied, a crack candidate plane in which a crack is expected to occur in a portion hidden from surfaces of the shape model, and an observation plane to be measured among the surfaces of the shape model;

an estimation model generation step of generating a matrix for estimating a state of the crack candidate plane from a state of the observation plane using matrices for associating the state of the crack candidate plane with the state of the observation plane, the matrices being obtained by a numerical analysis of a structural analysis model generated from the shape model;

a step of receiving actual measurement values of the observation plane;

a crack state analysis step of estimating a position and a size of the crack by obtaining a distribution of load and displacement in the crack candidate plane at the same time by probabilistic inference through application of an observation plane deformation vector indicating the deformation of the observation plane obtained from the measurement values, the matrix, and a latent variable indicating presence or absence of the crack in the crack candidate plane, wherein in the crack state analysis step, a probability distribution of displacement of the crack candidate plane estimated from the observation plane deformation vector and a forward coefficient matrix via the latent variable is calculated as a likelihood distribution, the forward coefficient matrix mapping from a crack plane matrix representing an analysis result of the crack candidate plane in a matrix to an observation plane matrix representing an analysis result of the observation plane in a matrix, the crack plane matrix and the observation plane matrix being included in the matrix, the observation plane deformation vector representing deformation of the observation plane of the target structure, a probability distribution of the load and the displacement in the crack candidate plane is estimated via the latent variable showing sparsity of the load and the displacement to calculate the obtained probability distribution of the load and the displacement in the crack candidate plane as a prior distribution, the load and the displacement having reciprocity, and a displacement distribution in the crack candidate plane is calculated by the probabilistic inference from the likelihood distribution and the prior distribution;

a step of receiving member information containing force applied to a rotating machine member during operation of the rotating machine and physical properties of a material constituting the rotating machine member:

a step of calculating a remaining period of use by determining a propagation lifetime of a crack obtained by using information on a size and a position of the crack obtained in the crack state analysis step and the member information; and a step of displaying the period of use that is calculated, wherein the target structure being the rotating machine member includes any one of a rotor constituting the rotating machine and a retaining ring shrink-fitted to an end of the rotor.

8. The failure diagnosis method of a rotating machine according to claim 7, wherein the estimation model generation step includes a step in which the structural analysis model is generated from the shape model, and from an analysis result obtained by performing a numerical analysis on all portions in the crack candidate plane by sequentially changing a boundary condition at which the crack occurs, information on crack portions that are made to occur and the analysis result of the crack candidate plane are stored in association with the analysis result of the observation plane, and a step in which the forward coefficient matrix and a stiffness matrix are calculated to output them as associated information which are to be used for the estimation, the forward coefficient matrix mapping from the crack plane matrix representing the stored analysis result of the observation plane in a matrix to the observation plane matrix representing the analysis result of the observation plane in a matrix, the stiffness matrix representing a relationship between the load and the displacement of the analysis result of the crack candidate plane.

9. The failure diagnosis method of a rotating machine according to claim 7, wherein, in the estimation model generation step, the numerical analysis is performed in which a shape or a condition is changed such that release of connections among a plurality of elements obtained by dividing the crack candidate plane or the displacement of the crack candidate plane results in the same as in a case where the crack occurs.

10. The failure diagnosis method of a rotating machine according to claim 7, wherein the shape model setting step includes a step of determining a distribution of an occurring stress in the target structure from measurement or a structural analysis, a step of selecting an appropriate evaluation stress for determining an occurrence location of the crack based on a material constituting the target structure and a distribution of the occurring stress, and a step of determining the crack candidate plane so as to be a plane that is perpendicular to a maximum principal stress direction at an occurrence location and penetrates a plane facing the occurrence location in the target structure, the occurrence location of the crack being a point where the occurring stress is maximum.

11. A failure diagnosis method of a rotating machine, comprising:

each step performed by the failure diagnosis method according to claim 7;

a step of receiving information on a limit condition of a crack that occurs in a rotating machine member; and a step of determining whether or not a size and a position of the crack obtained in the crack state analysis step exceed the limit condition and notifying an occurrence of a failure when the size and the position exceed the limit condition, wherein the target structure being the rotating machine member includes any one of a rotor constituting the rotating machine and a retaining ring shrink-fitted to an end of the rotor.

* * * * *